US011689884B2

(12) United States Patent
Frusina et al.

(10) Patent No.: US 11,689,884 B2
(45) Date of Patent: **\*Jun. 27, 2023**

(54) SYSTEM AND METHOD FOR PROVIDING DATA SERVICES ON VEHICLES

(71) Applicant: DEJERO LABS INC., Waterloo (CA)

(72) Inventors: Bogdan Frusina, Kitchener (CA); Jonathon Oberholzer, Waterloo (CA); David Pui Keung Sze, Waterloo (CA); Anthony Todd Schneider, Waterloo (CA); Akos Horvath, Kitchener (CA); Hagen Kaye, Waterloo (CA); Cameron Kenneth Smith, Oakville (CA); Barry Gilhuly, Waterloo (CA); Joseph Robert Wayne Mallet, Kitchener (CA); Robert Flatt, Kitchener (CA)

(73) Assignee: DEJERO LABS INC., Waterloo (CA)

( * ) Notice: Subject to any disclaimer, the term of this patent is extended or adjusted under 35 U.S.C. 154(b) by 221 days.

This patent is subject to a terminal disclaimer.

(21) Appl. No.: 17/103,593

(22) Filed: Nov. 24, 2020

(65) Prior Publication Data

US 2021/0076158 A1 Mar. 11, 2021

Related U.S. Application Data

(63) Continuation of application No. 16/134,076, filed on Sep. 18, 2018, now Pat. No. 10,924,887, which is a
(Continued)

(51) Int. Cl.
*H04W 4/02* (2018.01)
*H04W 76/15* (2018.01)
(Continued)

(52) U.S. Cl.
CPC ......... *H04W 4/023* (2013.01); *H04L 12/5692* (2013.01); *H04L 47/125* (2013.01);
(Continued)

(58) Field of Classification Search
CPC ..... H04W 4/023; H04W 28/10; H04W 76/15; H04W 28/0226; H04W 40/026;
(Continued)

(56) References Cited

U.S. PATENT DOCUMENTS 5,301,242 A 4/1994 Gonzales et al. ............. 382/239
5,365,552 A 11/1994 Astle ............................ 375/354
(Continued)

FOREIGN PATENT DOCUMENTS

CA 2505936 A1 5/2004
CA 2671266 A1 1/2011
(Continued)

OTHER PUBLICATIONS

EPO, Office Action for EP Application No. 15178347.9 dated May 24, 2017.
(Continued)

*Primary Examiner* — Walli Z Butt
(74) *Attorney, Agent, or Firm* — Norton Rose Fulbright Canada LLP

(57) ABSTRACT

Devices, systems, methods and computer-readable media are provided for data communication to and from a vehicle. A device is provided that includes memory storing processor-executable instructions; and at least one processor in communication with the memory that executes the stored instructions to: receive, from at least one user on the vehicle, at least one request for data communication; identify a plurality of communication links available at a current location of the moving vehicle; form an adaptive bonded communication link using the plurality of communication links to aggregate throughput across the plurality of communication links for the requested data communication, wherein the adaptive bonded communication link is configured to adapt to data communication requirements for the
(Continued)

US 11,689,884 B2
Page 2 requested data communication and to data communication characteristics of the plurality of communication links as the vehicle moves. Corresponding methods, computer system products, uses, and computer-readable media are also provided.

20 Claims, 12 Drawing Sheets

Related U.S. Application Data continuation of application No. 15/680,893, filed on Aug. 18, 2017, now Pat. No. 10,117,055, which is a continuation of application No. 14/680,476, filed on Apr. 7, 2015, now Pat. No. 9,756,468, which is a continuation-in-part of application No. 14/616,060, filed on Feb. 6, 2015, now Pat. No. 10,028,163, and a continuation-in-part of application No. 14/341,057, filed on Jul. 25, 2014, now Pat. No. 10,033,779, said application No. 14/616,060 is a continuation of application No. 14/114,984, filed as application No. PCT/IB2013/000690 on Apr. 16, 2013, now Pat. No. 8,984,576, which is a continuation-in-part of application No. 13/446,825, filed on Apr. 13, 2012, now Pat. No. 8,942,215, which is a continuation-in-part of application No. 13/183,652, filed on Jul. 15, 2011, now Pat. No. 9,042,444, said application No. 14/341,057 is a continuation-in-part of application No. 12/499,151, filed on Jul. 8, 2009, now Pat. No. 8,873,560.

(60) Provisional application No. 61/364,598, filed on Jul. 15, 2010.

(51) Int. Cl.

| | |
|---|---|
| *H04N 21/2365* | (2011.01) |
| *H04N 21/238* | (2011.01) |
| *H04N 21/414* | (2011.01) |
| *H04N 21/61* | (2011.01) |
| *H04W 28/10* | (2009.01) |
| *H04L 47/38* | (2022.01) |
| *H04L 47/125* | (2022.01) |
| *H04L 12/54* | (2022.01) |
| *H04L 69/14* | (2022.01) |
| *H04N 21/422* | (2011.01) |
| *H04N 21/442* | (2011.01) |
| *H04N 21/488* | (2011.01) |
| *H04N 21/647* | (2011.01) |
| *H04M 1/72457* | (2021.01) |
| *H04W 28/02* | (2009.01) |
| *H04L 47/2416* | (2022.01) |
| *H04L 47/26* | (2022.01) |
| *H04L 47/28* | (2022.01) |
| *H04W 40/02* | (2009.01) |

(52) U.S. Cl.
CPC ............ *H04L 47/38* (2013.01); *H04L 69/14* (2013.01); *H04M 1/72457* (2021.01); *H04N 21/238* (2013.01); *H04N 21/2365* (2013.01); *H04N 21/41407* (2013.01); *H04N 21/41422* (2013.01); *H04N 21/422* (2013.01); *H04N 21/44209* (2013.01); *H04N 21/488* (2013.01); *H04N 21/6106* (2013.01); *H04N 21/6112* (2013.01); *H04N 21/6131* (2013.01); *H04N 21/6137* (2013.01); *H04N 21/6143* (2013.01); *H04N 21/64723* (2013.01); *H04N 21/64738* (2013.01); *H04W 28/10* (2013.01); *H04W 76/15* (2018.02); *H04L 47/2416* (2013.01); *H04L 47/26* (2013.01); *H04L 47/28* (2013.01); *H04W 28/0226* (2013.01); *H04W 40/026* (2013.01)

(58) Field of Classification Search
CPC ... H04L 12/5692; H04L 47/125; H04L 47/38; H04L 69/14; H04L 47/2416; H04L 47/26; H04L 47/28; H04M 1/72457; H04N 21/2365; H04N 21/238; H04N 21/41407; H04N 21/41422; H04N 21/422; H04N 21/44209; H04N 21/488; H04N 21/6106; H04N 21/6112; H04N 21/6131; H04N 21/6137; H04N 21/6143; H04N 21/64723; H04N 21/64738
See application file for complete search history.

(56) References Cited

U.S. PATENT DOCUMENTS

| | | | |
|---|---|---|---|
| 5,550,578 A | 8/1996 | Hoarty et al. ................ 725/120 |
| 5,566,208 A | 10/1996 | Balakrishnan ............... 375/240 |
| 5,579,239 A | 11/1996 | Freeman et al. ........... 348/14.01 |
| 5,845,088 A | 12/1998 | Lewis ........................... 709/247 |
| 5,856,975 A | 1/1999 | Rostoker et al. ........ 370/395.64 |
| 5,872,784 A | 2/1999 | Rostoker et al. ........ 370/395.64 |
| 6,091,777 A | 7/2000 | Guetz ................... H04N 19/172 375/240.03 |
| 6,108,382 A | 8/2000 | Gringeri .............. H04N 19/159 348/14.13 |
| 6,111,913 A | 8/2000 | Murdock et al. ........ 375/240.03 |
| 6,115,420 A | 9/2000 | Wang .................... H04N 19/147 375/240.03 |
| 6,459,696 B1 | 10/2002 | Carpenter et al. ............ 370/350 |
| 6,542,481 B2 | 4/2003 | Foore .................... H04J 3/1682 370/329 |
| 6,567,533 B1 | 5/2003 | Rhoads ......................... 382/100 |
| 6,665,872 B1 | 12/2003 | Krishnamurthy et al. ..... 725/95 |
| 6,754,295 B1 | 6/2004 | Hartnett ....................... 375/356 |
| 6,834,044 B2 | 12/2004 | Sugirtharaj et al. |
| 6,999,511 B2 | 2/2006 | Boice et al. .................. 375/240 |
| 7,178,159 B1 | 2/2007 | Ando et al. ..................... 725/43 |
| 7,295,608 B2 | 11/2007 | Reynolds et al. ........ 375/240.01 |
| 7,424,730 B2 | 9/2008 | Chou ............................. 725/87 |
| 7,529,230 B2 | 5/2009 | Lewis .................. G06Q 20/102 370/328 |
| 7,679,649 B2 | 3/2010 | Ralston et al. ............. 348/211.3 |
| 8,036,265 B1 | 10/2011 | Reynolds et al. ........ 375/240.01 |
| 8,094,713 B2 | 1/2012 | Clark ................... H04L 43/0829 375/240.01 |
| 8,121,069 B2 | 2/2012 | Lewis et al. .................. 370/328 |
| 8,135,398 B2 | 3/2012 | Wang et al. ................. 455/426.2 |
| 8,175,404 B2 | 5/2012 | Bichlmaier .......... H04N 17/004 375/240.15 |
| 8,250,618 B2 | 8/2012 | Rosenzweig et al. .......... 725/96 |
| 8,265,165 B2 | 9/2012 | Park ...................... H04N 19/172 375/240.24 |
| 8,612,624 B2 | 12/2013 | Frueck .............. H04L 29/06027 709/231 |
| 8,619,602 B2 | 12/2013 | Begen ................... H04L 41/083 370/232 |
| 8,639,260 B2 | 1/2014 | Fox et al. .................... 455/452.1 |
| 8,670,437 B2 | 3/2014 | Walker et al. ................ 370/349 |
| 8,683,542 B1 | 3/2014 | Henry .................... H04L 1/0026 370/358 |
| 8,823,772 B2 | 9/2014 | Suh ...................... H04N 19/597 348/43 |
| 8,873,560 B2 | 10/2014 | Frusina ................. H04L 5/003 370/394 |
| 8,897,322 B1 | 11/2014 | Woleben |
| 9,106,787 B1 | 8/2015 | Holmer ............... H04L 47/2416 |
| 9,756,468 B2 * | 9/2017 | Frusina ............... H04L 12/5692 |
| 10,033,779 B2 | 7/2018 | Frusina .................. H04L 5/003 |

(56) References Cited

U.S. PATENT DOCUMENTS

| | | | |
|---|---|---|---|
| 10,117,055 B2* | 10/2018 | Frusina | H04N 21/44209 |
| 10,165,286 B2 | 12/2018 | Sze | H04N 19/166 |
| 10,547,656 B2 | 1/2020 | Frusina | H04N 21/631 |
| 10,924,887 B2* | 2/2021 | Frusina | H04N 21/64723 |
| 2001/0024239 A1 | 9/2001 | Feder et al. | 348/423.1 |
| 2001/0039661 A1 | 11/2001 | Hua et al. | 725/86 |
| 2001/0047423 A1 | 11/2001 | Shao | H04L 29/06 709/235 |
| 2002/0053075 A1 | 5/2002 | Paz et al. | 725/10 |
| 2002/0059643 A1 | 5/2002 | Kitamura et al. | 725/136 |
| 2002/0062482 A1 | 5/2002 | Bolle et al. | 725/105 |
| 2002/0101921 A1 | 8/2002 | Golin | 375/240.01 |
| 2002/0114332 A1 | 8/2002 | Apostolopoulos et al. | |
| 2003/0011714 A1 | 1/2003 | Nevins, Jr. | 348/589 |
| 2003/0067872 A1 | 4/2003 | Harrell | H04L 29/06027 370/229 |
| 2003/0118111 A1 | 6/2003 | Kim | H04N 19/40 375/240.24 |
| 2003/0156601 A1 | 8/2003 | Planka | H04L 29/06027 370/477 |
| 2003/0161311 A1 | 8/2003 | Hiironniemi | H04L 45/00 370/392 |
| 2003/0185249 A1 | 10/2003 | Davies et al. | 370/535 |
| 2004/0016000 A1 | 1/2004 | Zhang et al. | |
| 2004/0045030 A1 | 3/2004 | Reynolds et al. | 725/110 |
| 2004/0095907 A1 | 5/2004 | Agee | H04B 7/0417 370/334 |
| 2004/0146211 A1 | 7/2004 | Knapp | H04N 21/233 382/236 |
| 2004/0202249 A1 | 10/2004 | Lo | H04N 19/895 375/240.16 |
| 2004/0237104 A1 | 11/2004 | Cooper et al. | 725/38 |
| 2004/0255063 A1 | 12/2004 | Crinon et al. | 710/55 |
| 2005/0010960 A1 | 1/2005 | Kitazawa et al. | 725/117 |
| 2005/0060421 A1 | 3/2005 | Musunuri et al. | 709/231 |
| 2005/0073725 A1 | 4/2005 | Lim | |
| 2005/0074061 A1 | 4/2005 | Ribas-Corbera et al. | 375/240.01 |
| 2005/0113066 A1 | 5/2005 | Hamberg | 455/411 |
| 2005/0163093 A1 | 7/2005 | Garg et al. | |
| 2005/0175098 A1 | 8/2005 | Narasimhan et al. | 375/240.12 |
| 2005/0180415 A1 | 8/2005 | Cheung et al. | 370/389 |
| 2005/0210515 A1 | 9/2005 | Roh et al. | 725/81 |
| 2005/0259729 A1 | 11/2005 | Sun | H04N 19/36 375/240.1 |
| 2006/0221933 A1 | 10/2006 | Bauer et al. | 370/352 |
| 2006/0224762 A1 | 10/2006 | Tian | H04N 21/2187 709/231 |
| 2006/0244840 A1 | 11/2006 | Eshet et al. | 348/222.1 |
| 2007/0009045 A1 | 1/2007 | Mohandas | G06T 7/00 375/240.25 |
| 2007/0021117 A1 | 1/2007 | McKenna et al. | 455/431 |
| 2007/0074251 A1 | 3/2007 | Oguz | H04N 19/105 725/45 |
| 2007/0074266 A1 | 3/2007 | Raveendran | H04N 5/144 725/135 |
| 2007/0177579 A1 | 8/2007 | Diethorn et al. | 370/352 |
| 2007/0178932 A1 | 8/2007 | Miklos et al. | 455/525 |
| 2007/0199011 A1 | 8/2007 | Zhang et al. | 725/1 |
| 2007/0204318 A1 | 8/2007 | Ganesh et al. | 725/118 |
| 2007/0249422 A1 | 10/2007 | Podoloff | 463/43 |
| 2007/0263720 A1 | 11/2007 | He | H04N 19/124 375/240.03 |
| 2008/0049630 A1 | 2/2008 | Kozisek | H04L 41/0823 370/250 |
| 2008/0049650 A1 | 2/2008 | Coppage et al. | |
| 2008/0091838 A1 | 4/2008 | Miceli | |
| 2008/0101459 A1 | 5/2008 | Kwon et al. | 375/240.01 |
| 2008/0165727 A1 | 7/2008 | Xiaoben | H04W 16/04 370/329 |
| 2008/0165861 A1 | 7/2008 | Wen | H04N 19/132 375/240.26 |
| 2008/0170630 A1 | 7/2008 | Falik et al. | 375/240.29 |
| 2008/0196076 A1 | 8/2008 | Shatz et al. | 725/116 |
| 2008/0221918 A1 | 9/2008 | Petersen et al. | 705/2 |
| 2008/0278575 A1 | 11/2008 | Matsui | A61B 1/041 348/72 |
| 2009/0061954 A1 | 3/2009 | Syed | 455/574 |
| 2009/0110060 A1 | 4/2009 | Cortes | H04N 19/46 375/240.03 |
| 2009/0147859 A1 | 6/2009 | McGowan | H04N 21/23424 375/240.26 |
| 2009/0168701 A1 | 7/2009 | White et al. | |
| 2009/0216910 A1 | 8/2009 | Duchesneau | 709/250 |
| 2009/0278941 A1 | 11/2009 | Smith et al. | |
| 2009/0279483 A1* | 11/2009 | Falchuk | H04L 41/0896 370/328 |
| 2009/0323803 A1 | 12/2009 | Gomila | H04N 19/172 375/240.02 |
| 2010/0008245 A1 | 1/2010 | Viger | H04L 47/10 370/252 |
| 2010/0027419 A1* | 2/2010 | Padhye | H04L 5/0062 370/235 |
| 2010/0036964 A1 | 2/2010 | Cedervall | H04N 7/173 709/231 |
| 2010/0041397 A1* | 2/2010 | Chutorash | H04W 48/18 455/67.11 |
| 2010/0054329 A1 | 3/2010 | Bronstein et al. | |
| 2010/0080287 A1 | 4/2010 | Ali | H04N 19/166 375/240.03 |
| 2010/0082810 A1 | 4/2010 | Patel et al. | 709/225 |
| 2010/0082834 A1 | 4/2010 | Joung et al. | 709/231 |
| 2010/0142421 A1 | 6/2010 | Schlicht et al. | 370/310 |
| 2010/0142477 A1 | 6/2010 | Yokota | 370/331 |
| 2010/0161761 A1 | 6/2010 | Yu | H04N 21/2402 709/219 |
| 2010/0189089 A1 | 7/2010 | Lynch et al. | 370/338 |
| 2010/0192212 A1 | 7/2010 | Raleigh | 726/7 |
| 2010/0195741 A1 | 8/2010 | Chou | H04N 19/156 375/240.26 |
| 2010/0197288 A1 | 8/2010 | Camilleri | H04M 3/42195 455/416 |
| 2010/0232498 A1 | 9/2010 | Liu | H04N 19/196 375/240.03 |
| 2010/0316066 A1 | 12/2010 | Leung | H04N 21/44209 370/468 |
| 2011/0002376 A1 | 1/2011 | Ahmed et al. | 375/240.01 |
| 2011/0051807 A1 | 3/2011 | Liu | H04N 19/176 375/240.03 |
| 2011/0188567 A1 | 8/2011 | Blum | H04L 1/0002 375/240.02 |
| 2011/0249127 A1 | 10/2011 | Zhang | H04N 17/004 348/192 |
| 2011/0295727 A1 | 12/2011 | Ferris | G06Q 40/12 705/34 |
| 2012/0008560 A1 | 1/2012 | Lewis et al. | 370/328 |
| 2012/0020298 A1 | 1/2012 | Shon | H04W 48/18 370/328 |
| 2012/0260296 A1 | 10/2012 | Mallet | H04W 76/15 725/62 |
| 2012/0290688 A1 | 11/2012 | Nandakumar | H04L 65/4084 709/219 |
| 2012/0294355 A1 | 11/2012 | Holcomb et al. | |
| 2013/0077501 A1 | 3/2013 | Krishnaswamy | |
| 2013/0252558 A1 | 9/2013 | Nieto | H04W 72/08 455/73 |
| 2013/0263200 A1 | 10/2013 | Li | H04L 47/38 725/116 |
| 2013/0282917 A1 | 10/2013 | Reznik | H04N 21/4402 709/231 |
| 2014/0040442 A1* | 2/2014 | Saavedra | H04L 12/2867 709/221 |
| 2014/0250486 A1 | 9/2014 | Sze et al. | |
| 2014/0321561 A1 | 10/2014 | Stec | H04N 19/134 375/240.29 |
| 2015/0011311 A1 | 1/2015 | Relan | A63F 13/30 463/31 |

(56) References Cited

U.S. PATENT DOCUMENTS

| | | | |
|---|---|---|---|
| 2015/0036757 A1 | 2/2015 | Schink | H04N 19/136 375/240.29 |
| 2015/0057044 A1* | 2/2015 | Altman | H04W 12/08 455/558 |
| 2017/0251515 A1* | 8/2017 | Altman | H04L 43/20 |

FOREIGN PATENT DOCUMENTS

| | | |
|---|---|---|
| CA | 2842098 A1 | 1/2012 |
| DE | 102004049705 A1 | 4/2006 |
| EP | 1748655 A2 | 1/2007 |
| EP | 2273715 A2 | 1/2011 |
| WO | 2010030489 A2 | 3/2010 |
| WO | 2012006744 A1 | 1/2012 |
| WO | 2012099762 A1 | 7/2012 |
| WO | 2013184374 A1 | 12/2013 |

OTHER PUBLICATIONS

United States Patent and Trademark Office, Office Action dated Oct. 12, 2011, issued on U.S. Appl. No. 12/499,151.

United States Patent and Trademark Office, Office Action dated May 22, 2012, issued on U.S. Appl. No. 12/499,151.

United States Patent and Trademark Office, Office Action dated Dec. 21, 2012, issued on U.S. Appl. No. 12/499,151.

United States Patent and Trademark Office, Office Action dated Jun. 21, 2013; issued on U.S. Appl. No. 12/499,151.

United States Patent and Trademark Office, Office Action dated Jan. 16, 2014, issued on U.S. Appl. No. 12/499,151.

IP Australia; Office Action dated Aug. 4, 2014, issued on Australian Patent Application No. 2010202903.

Chi-Yuan et al.; "Rate Control for Robust Video Transmission over Burst-Error Wireless Channels"; IEEE Journal on Selected Areas in Communication; vol. 17 No. 5; May 1, 1999; Piscataway, New Jersey, U.S.A.

European Patent Office; EPO Form 1507N—Extended European Search Report dated Jun. 8, 2011; European patent application No. 10168544.4; Munich, Germany.

European Patent Office, Office Action dated Oct. 17, 2014, issued on European Patent Application No. 10168544.4.

European Patent Office (EPO), Extended European Search Report (EESR) against EP Application No. 20171053.0 dated Aug. 6, 2020.

European Patent Office (EPO), Communication from the Examining Division pursuant to Article 94(3) EPC against EP Application No. 20171053.0 dated Feb. 10, 2022.

UK Examination Report issued in British Patent Application No. 1302081.3, dated Jun. 19, 2014.

International Search Report and Written Opinion issued in International Patent Application No. PCT/CA2011/050437, dated Aug. 25, 2011.

International Search Report and Written Opinion issued in International Application No. PCT/IB2013/000690, dated Sep. 16, 2013.

USPTO Office Action issued in U.S. Appl. No. 13/446,825, dated Dec. 19, 2013.

Office Action Response filed in U.S. Appl. No. 13/446,825, dated Mar. 19, 2014.

USPTO Office Action issued in U.S. Appl. No. 14/680,476, dated Oct. 18, 2016.

European Search Report issued in European Application No. 16164092.5, dated Aug. 22, 2016.

USPTO Office Action issued in U.S. Appl. No. 14/616,060, dated Jul. 12, 2016.

European Search Report issued in European Application No. 13775296.0, dated Oct. 29, 2015.

International Search Report and Written Opinion issued in International Application No. PCT/CA2015/000448, dated Oct. 30, 2015.

Extended European Search Report issued in European Application No. 15178347.9, dated Dec. 16, 2015.

Nguyen, T. et al., "Multiple Sender Distributed Video Streaming", IEEE Transactions on Multimedia, IEEE Service Centre, Piscataway, N.J., United States, vol. 6, No. 2, Apr. 1, 2004.

USPTO Office Action issued in U.S. Appl. No. 14/815,363, dated Mar. 20, 2018.

Extended European Search Report issued in European Application No. 15827758.2, dated Jan. 29, 2018.

Anonymous, "Peak Signal-to-Noise Ratio as an Image Quality Metric—National Instruments", Retrieved from the internet: URL: http://www.ni.comjwhite-paper/13306/en, published Sep. 11, 2013.

Weisi, L. et al., "Perceptual Visual Quality Metrics: A Survey", Journal of Visual Communication and Image Representation, vol. 22, No. 4, p. 297-312, May 1, 2011.

Lee et al., "High Quality, Low Delay Foveated Visual Communications Over Mobile Channels", Journal of Visual Communication and Image Representation, Academic Press Inc., USA, vol. 16, No. 2, p. 180-211, Apr. 1, 2005.

European Examination Report issued in European Application No. 13775296.0, dated Jan. 24, 2018.

USPTO Office Action issued in U.S. Appl. No. 14/815,363, dated Jan. 11, 2017.

USPTO Office Action issued in U.S. Appl. No. 13/439,352, dated May 26, 2016.

USPTO Notice of Allowance issued in U.S. Appl. No. 13/446,825, dated Jul. 18, 2014.

USPTO Office Action issued in U.S. Appl. No. 13/183,652, dated May 21, 2014.

USPTO Notice of Allowance issued in U.S. Appl. No. 13/183,652, dated Jan. 22, 2015.

Australian Examination Report issued in Australian Application No. 2015296746, dated Nov. 9, 2017.

European Examination Report issued in European Application No. 10168544.4, dated Oct. 17, 2014.

European Communication and Extended Search Report issued in European Application No. 10168544.4, dated Jun. 8, 2011.

Chi-Yuan et al., "Rate Control for Robust Video Transmission Over Burst-Error Wireless Channels", IEEE Journal on Selected Areas in Communication, vol. 17, issue 5, May 1999.

European Response submitted in European Application No. 10168544.4, dated Apr. 23, 2012.

European Communication pursuant to Article 94(3) in European Application No. 10168544.4, dated May 24, 2012.

European Response to Communication pursuant to Article 94(3) filed in European Application No. 10168544.4, dated Nov. 30, 2012.

European Communication pursuant to Article 94(3) in European Application No. 10168544.4, dated Sep. 24, 2013.

European Response to Communication pursuant to Article 94(3) filed in European Application No. 10168544.4, dated Jan. 24, 2014.

USPTO Office Action issued in U.S. Appl. No. 12/499,151, dated Oct. 12, 2011.

USPTO Office Action issued in U.S. Appl. No. 12/499,151, dated May 22, 2012.

USPTO Office Action issued in U.S. Appl. No. 12/499,151, dated Dec. 21, 2012.

USPTO Office Action issued in U.S. Appl. No. 12/499,151, dated Jun. 21, 2013.

USPTO Office Action issued in U.S. Appl. No. 12/499,151, dated Jan. 16, 2014.

Australian Examination Report issued in Australian Application No. 2010202903, dated Aug. 4, 2014.

Yang, L. et al., "Bi-Directional Entire Frame Recovery in MDC Video Streaming", Communications and Information Technology, vol. 2, IEEE International Symposium, Oct. 2005, Bejing, China, p. 1023-1026.

Van Dyck, R. et al., "Transport of Wireless Video Using Separate, Concatenated, and Joint Source-Channel Coding", IEEE Journal Magazine, Oct. 1999, v. 87|10, PA, USA, Oct. 1999, p. 1734-1750.

Manish, J. et al., "Path Selection Using Available Bandwidth Estimation in Overlay-Based Video Streaming", Computer Networks, vol. 52|12, Telchemy Inc., USA, Aug. 22, 2008, p. 2411-2418.

(56) References Cited

OTHER PUBLICATIONS

Toufik, A. et al., "P2P Object-Based Adaptive Multimedia Streaming (POEMS)", Journal of Network and Systems Management, vol. 15, n. 3, Springer, New York, USA, Sep. 2007, p. 289-310.

Martini, M. et al., "Content Adaptive Network Aware Joint Optimization of Wireless Video Transmission", Communications Magazine, IEEE, vol. 45|1, Toronto, Ontario, Canada, Jan. 2007, p. 84-90.

Batra, P. et al., "Effective Algorithms for Video Transmission Over Wireless Channels", Signal Processing, Image Communication, vol. 12, issue 12, Elsevier, Amsterdam, Apr. 1998, p. 147-166.

Budgavi, M. et al., "Multiframe Video Coding for Improved Performance Over Wireless Channels", Image Processing, IEEE Transactions, vol. 10, issue 2, Dallas, Texas, USA, Feb. 2001, p. 252-265.

"Network Adaptive Scalable Video Streaming Over 3G Wireless Network", Image Proceedings, 2001 International Conference, vol. 3, Thessaloniki, Greece, Oct. 7-10, 2001, p. 579-582.

Wang, T. et al., "Low-Delay and Error-Robust Wireless Video Transmission for Video Communications", IEEE Transactions on Circuits and Systems for Video Technology, vol. 12, issue 12, New York, NY, USA, Dec. 2002, p. 1049-1058.

Tesanovic, M. et al., "Enhanced MIMO Wireless Video Communication Using Multiple-Description Coding", Image Communication, col. 23, issue 4, New York, NY, USA, Apr. 2008, p. 325-336.

European Examination Report issued in European Application No. 13775296.0, dated Jun. 26, 2018.

Texas Instruments, "OMAP(TM) 4 Mobile Applications Platform", Texas Instruments Incorporated, Dallas, Texas, 2011.

UK Intellectual Property Office, Examination Report under Section 18(3) dated Jun. 19, 2014, issued on Great Britain Patent Application No. 1302081.3.

Canadian Intellectual Property Office as International Searching Authority, International Search Report and Written Opinion for International Patent App. No. PCT/CA2011/050437, dated Aug. 25, 2011.

Patent Cooperation Treaty, International Search Report and Written Opinion dated Sep. 16, 2013, issued on PCT Application No. PCT/IB2013/000690.

United States Patent and Trademark Office, Office Action dated Dec. 19, 2013, issued in U.S. Appl. No. 13/446,825.

Norton Rose Fulbright Canada LLP, Office Action Response dated Mar. 19, 2014, submitted on U.S. Appl. No. 13/446,825.

USPTO, references for US Application No. 15680893 dated Jun. 12, 2018.

USPTO, Notice of allowance for U.S. Appl. No. 14/341,057 dated Mar. 23, 2018.

EPO, Extended European Search Report for EP Application No. 15827758.2 dated Jan. 29, 2018.

Anonymous: "Peak Signal-to-Noise Ratio as an Image Quality Metric—National Instruments", Sep. 11, 2013, Retrieved from the Internet: URL:http://www.ni.comjwhite-paper/13306/en, retrieved on Jan. 19, 2018.

Weisi Lin et al: Perceptual visual quality metrics: A survey, Journal of Visual Communication and Image Representation, May 1, 2011, vol. 22, No. 4, pp. 297-312.

Lees et al: High quality. low delay foveated visual communications over mobile channels, Journal Of Visual Communication And Image Representat. Academic Press. Inc. US., Apr. 1, 2005, vol. 16. No. 2., pp. 180-211.

European Examination Report issued in European Application No. 13775296.0, dated Jun. 27, 2018.

Texas Instruments, "OMAP(TM) 4 Mobile Applications Platform", Product Bulletin, 2011, Texas Instruments Incorporated.

IP Australia, Examination report No. 1 AU Application No. 2015296746 dated Nov. 9, 2017.

United States Patent and Trademark Office, Office Action dated Jul. 12, 2016 issued in U.S. Appl. No. 14/616,060.

European Patent Office, extended European Search Report dated Oct. 29, 2015, issued in European Patent Application No. 13775296.0.

International Searching Authority, International Search Report and Written Opinion dated Oct. 30, 2015, in International Application No. PCT/CA2015/000448.

European Patent Office, Extended European Search Report dated Dec. 16, 2015, issued in European Patent Application No. 15178347.9.

USPTO Non-Final Office Action for U.S. Appl. No. 14/815,363 dated Mar. 20, 2018.

Lee et al: High quality, low delay foveated visual communications over mobile channels, Journal Of Visual Communication And Image Representat. Academic Press. Inc. US., Apr. 1, 2005, vol. 16. No. 2., pp. 180-211.

EPO, Office Action for EP Application No. 13775296.0 dated Jan. 24, 2018.

USPTO, Office Action for U.S. Appl. No. 14/680,476 dated Oct. 18, 2016.

Patent Cooperation Treaty, International Search Report and Written Opinion dated Aug. 25, 2011, issued on PCT Application No. PCT/CA2011/050437.

United States Patent and Trademark Office, Notice of Allowance dated Jul. 18, 2014, issued in U.S. Appl. No. 13/446,825.

United States Patent and Trademark Office, Office Action dated May 21, 2014, issued in U.S. Appl. No. 13/183,652.

United States Patent and Trademark Office, Notice of Allowance dated Jan. 22, 2015, issued in U.S. Appl. No. 13/183,652.

USPTO, Office Action for U.S. Appl. No. 14/815,363 dated Jan. 11, 2017.

United States Patent and Trademark Office, Office Action dated May 26, 2016, issued in U.S. Appl. No. 13/439,352.

European Patent Office, European Search Report for EU Application No. 16164092.5 dated Aug. 22, 2016.

European Patent Office, Office Action dated Oct. 17, 2014, issued in European Patent Application 10168544.4.

European Patent Office, Communication and extended European search report dated Jun. 8, 2011, issued on European Patent Application No. 10168544.4.

Zacco Denmark A/S, Response dated Apr. 23, 2012 regarding extended European search report, submitted on European Patent Application No. 10168544.4.

European Patent Office, Communication pursuant to Article 94(3) EPC dated May 24, 2012, issued on European Patent Application No. 10168544.4.

Zacco Denmark A/S, Response to the Communication pursuant to Article 94(3) EPC dated Sep. 24, 2013 submitted on European Patent Application No. 10168544.4.

Yang Lui; Rui Zhou; Huijuan Cui; Kun Tang; "Bi-Directional Entire Frame Recovery in MDC Video Streaming"; Communications and Information Technology, 2005. International Symposium; IEEE International Symposium, Oct. 12-14, 2005; pp. 1023-1026; v2; Beijing, China.

Van Dyck, R.E., Miller, D.J., "Transport of Wireless Video Using Separate, Concatenated, and Joint Source-Channel Coding"; EEE Journal magazine; Oct. 1999; pp. 1734-1750; v.87 i10, PA, USA.

Manish Jain, Dovrolis, Constantine; "Path Selection using Available Bandwidth Estimate on in Overlay-based Video Streaming"; Computer Networks, Aug. 22, 2008, pp. 2411-2418, v.52 i.12, Telchemy Inc., U.S.A.

Manish Jain, Dovrolis, Constantine; "Path Selection Using Available Bandwidth Estimation in Overlay-Based Video Streaming", Lecture Notes in Computer Science—Networking 2007. Ad Hoc and Sensor Networks, Wireless Networks, Next Generation Internet; pp. 628-639; v.4479/2009; Springer Berlin/Heidelberg.

Toufik Ahmed, Viubashar Mushtaq; "P2P Object-based adaptive Multimedia Streaming (POEMS)"; Journal of Network and Systems Management; Sep. 2007; pp. 289-310; v15, n3, Springer, New York; NY USA.

Maria G. Martini, Matteo Mazzotti, Catherine Lamy-Bergot, Jyrki Huusko, Peter Amon; "Content Adaptive Network Aware Joint Optimization of Wireless Video Transmission"; Communications Magazine, IEEE, Jan. 2007; pp. 84-90;v45, il; Toronto, Ontario, Canada.

(56) References Cited

OTHER PUBLICATIONS

Batra, Pankaj; Chang, Shih-Fu; "Effective Algorithms for Video Transmission over Wireless Channels" Signal processing. Image communication, V 12, Issue 12, Apr. 1998, pp. 147-166 Elsevier, Amsterdam.

Budagavi, M.; Gibson, J.D. "Multiframe Video Coding for Improved Performance over Wireless Channels" Image Processing, IEEE Transactions, v. 10, Issue 2, Feb. 2001 pp. 252-265, Dallas Texas USA.

Network-Adaptive Scalable Video Streaming over 3g Wireless Network, Image Proceedings, 2001 International Conference Oct. 7-10, 2001, v. 3, pp. 579-582, Thessaloniki, Greece.

Wang, Tu-Chih; Fang, Hung-Chi; Chen, Liang-Gee, "Low-Delay and Error-Robust Wireless Video Transmission for Video Communications", IEEE transactions on circuits and systems for video technology, v. 12, issue 12, Dec. 2002, pp. 1049-1058, New York, NY, USA.

Tesanovic, Milos; Bull, David R.; Doufexi, Angela; Nix, Andrew, "Enhanced MIMO Wireless Video Communication using Multiple-Description Coding", Image Communication, v.23, issue 4, Apr. 2008, pp. 325-336, New York, NY, USA.

Nguyen, Thinh and Zakhor, Avideh, "Multiple Sender Distributed Video Streaming", IEEE Transactions on Multimedia, Apr. 2004, vol. No. 6, Issue No. 2.

Zacco Denmark A/S, Response dated Nov. 30, 2012 regarding the Communication pursuant to Article 94(3) EPC, submitted on European Patent Application No. 10168544.4.

European Patent Office, Communication pursuant to Article 94(3) EPC dated Sep. 24, 2013, issued on European Patent Application No. 10168544.4.

United States Patent and Trademark Office, Office Action dated Nov. 2, 2015, issued in U.S. Appl. No. 13/439,352.

International Searching Authority, International Search Repod and Written Opinion dated Oct. 30, 2015, in International Application No. PCT/CA2015/000448.

USPTO, Office Action for U.S. Appl. No. 12/499,151 dated Oct. 12, 2011.

USPTO, Office Action for U.S. Appl. No. 12/499,151 dated May 22, 2012.

USPTO, Office Action for U.S. Appl. No. 12/499,151 dated Dec. 21, 2012.

USPTO, Office Action for U.S. Appl. No. 12/499,151 dated Jun. 21, 2013.

USPTO, Office Action for U.S. Appl. No. 12/499,151 dated Jan. 16, 2014.

USPTO, Office Action for U.S. Appl. No. 13/183,652 dated May 21, 2014.

USPTO, Office Action for U.S. Appl. No. 14/341,057 dated Jun. 2, 2017.

USPTO, Office Action for U.S. Appl. No. 14/341,057 dated Nov. 2, 2017.

USPTO, Office Action for U.S. Appl. No. 14/616,060 dated Jul. 12, 2016.

USPTO, Office Action for U.S. Appl. No. 14/616,060 dated Feb. 10, 2017.

WIPO, International Search Report and Written Opinion for US Application No. PCT/IB2013/000690 dated Sep. 13, 2016.

Extended European Search Report issued in European Application No. 19171970, dated Sep. 11, 2019.

United States Office Action issued in U.S. Appl. No. 13/439,352, dated Nov. 2, 2015.

Manish, J. et al., "Path Selection Using Available Bandwidth Estimation in Overlay-Based Video Streaming", Lecture Notes in Computer Science—Networking 2007, College of Computing, Georgia Institute of Technology.

Patent Cooperation Treaty, International Search Rep0it and Written Opinion dated Aug. 25, 2011, issued on PCT Application No. PCT/CA2011/050437.

European Patent Office, Communication and extedned European search report dated Jun. 8, 2011, issued on European Patent Application No. 10168544.4.

Chi-Yuan Hsu et al., "Rate Control for Robust Video Transmission Over Burst-Error Wireless Channels", IEEE Journal on Selected Areas in Communication, May 1999, vol. No. 17, Issue No. 5.

* cited by examiner

SYSTEM AND METHOD FOR PROVIDING DATA SERVICES ON VEHICLES

CROSS-REFERENCE TO RELATED APPLICATIONS

This application is a continuation of U.S. patent application Ser. No. 16/134,076 filed on Sep. 18, 2018, which is a continuation of Ser. No. 15/680,893, filed Aug. 18, 2017, which is a continuation of U.S. patent application Ser. No. 14/680,476 filed Apr. 7, 2015, which is a continuation-in-part of U.S. patent application Ser. No. 14/616,060, filed Feb. 6, 2015, which is a continuation of U.S. application Ser. No. 14/114,984, filed Oct. 31, 2013, which is the National Stage of International Application No. PCT/IB2013/000690, filed Apr. 16, 2013, which is a continuation-in-part of U.S. application Ser. No. 13/446,825, filed Apr. 13, 2012, which is a continuation-in-part of U.S. application Ser. No. 13/183,652, filed Jul. 15, 2011, which claims the benefit of U.S. Provisional Application No. 61/364,598, filed Jul. 15, 2010.

U.S. patent application Ser. No. 14/680,476 filed Apr. 7, 2015 is also a continuation-in-part of U.S. patent application Ser. No. 14/341,057, filed Jul. 25, 2014, which is a continuation-in-part of U.S. patent application Ser. No. 12/499,151 filed Jul. 8, 2009.

The contents of each of these related applications are hereby incorporated by reference.

FIELD

The embodiments described herein relate generally to data communications, and more particularly to systems, devices, methods, computer program products, and computer-readable media relating to mobile applications that require data communications to and from a vehicle.

INTRODUCTION

Demand for data communication services continues to grow. In particular, there is a growing demand amongst users for access to data communication services when using a variety of mobile applications while traveling, e.g., by way of buses, trains, subways, trams, airplanes, ships, etc. This has increased the need for data communication services to be provided to users using these modes of transportation.

Access to such data services may provide for greater productivity, a wider range of entertainment options, etc., which may be desirable for users in a wide range of mobile scenarios.

Solutions currently available on the market may have deficiencies with reliability, bandwidth, and/or contention. For example, some solutions rely on a single connection to provide data communication services. However, a single connection may not be reliably available in mobile scenarios, and/or may not provide sufficient bandwidth, and/or latency.

A new, improved, and/or different solution is thus needed for overcoming the shortfalls of the solutions currently available in the market.

SUMMARY

The present disclosure relates to mobile applications that require data communication to and from a vehicle.

In an aspect, there is provided a device for data communication to and from a vehicle. The device includes: memory storing processor-executable instructions; a plurality of communication interfaces; and at least one processor in communication with the memory and the plurality of communication interfaces. The at least one processor is configured to execute the stored instructions to: receive, from at least one user on the vehicle, at least one request for data communication; identify a plurality of communication links available at a current location of the vehicle for communication by way at least one of the communication interfaces; form an adaptive bonded communication link using the plurality of communication links to aggregate throughput across the plurality of communication links for the requested data communication, wherein the adaptive bonded communication link is configured to adapt to data communication requirements for the requested data communication and to data communication characteristics of the plurality of communication links as the vehicle moves.

The adapting of the adaptive bonded communication link may be in real-time or near real-time, and is responsive to at least one of (i) changes in the data communication requirements and (ii) changes in the data communication characteristics of the plurality of communication links.

The plurality of communication interfaces may include a radio frequency interface.

The device may include a first device located at a first vehicle, and the first device may be configured to establish a mesh network with a second device located at a second vehicle.

The first device may be configured to establish at least one of the plurality of communication links by way of the mesh network.

The adaptive bonded communication link may be formed at least in part through an airborne vehicle.

The at least one processor may execute the stored instructions to provide a virtual subscriber identity module (SIM) manager that configures at least one the communication interfaces with SIM information.

At least one of the plurality of network interfaces may include a plurality of subscriber identity modules, and the at least one processor may execute the stored instructions to select a particular one of the plurality of subscriber identity modules for forming the adaptive bonded communication link.

The data communication characteristics may include at least one of: network costs, monetary costs, available bandwidth, latency, and packet loss rates, data transfer available under a data plan associated with at least one SIM.

The monetary costs may include at least one of spot pricing costs and overage pricing costs.

The data communication requirements may include at least one of: a minimum packet loss requirement, a bandwidth requirement, a latency requirement, a status associated with the at least one user, and a Quality of Service (QoS) requirement.

The QoS requirement may be set by at least one pre-defined QoS rule.

The at least one pre-defined QoS rule may take into account at least one of the bandwidth requirement and the latency requirement.

The at least one pre-defined QoS rule may take into account the status associated with the at least one user.

The adaptive bonded communication link may be formed based on a jurisdiction associated with at least one of the plurality of communication links.

The at least one processor may execute the stored instructions to restrict data communications based on a jurisdiction associated with at least one of the plurality of communication links.

The data communications may be restricted according to content type.

In a further aspect, there is provided a computer-implemented method for providing data communication to and from a vehicle. The method includes: receiving, at at least one processor, at least one request for data communication from at least one user on the vehicle; identifying, at the at least one processor, a plurality of communication links available at a current location of the vehicle for communication by way at least one communication interfaces; and forming, at the at least one processor, an adaptive bonded communication link using the plurality of communication links to aggregate throughput across the plurality of communication links for the requested data communication; wherein the adaptive bonded communication link is configured to adapt to data communication requirements for the requested data communication and to data communication characteristics of the plurality of communication links as the vehicle moves.

In another aspect, there is provided a system for data communication across a plurality of communication links to and from a vehicle, involving at least one mobile device on the vehicle. The system includes one or more servers, each having a processor and one or more computer readable memories, the one or more servers providing a first utility located on the vehicle and a second utility located remotely from the vehicle. At least one of the first and second utilities is configured for: receiving a request to retrieve electronic data from a data source by the at least one mobile device; identifying a plurality of communication links available to the vehicle; forming an adaptive bonded communication link using the plurality of communication links to aggregate throughput across the plurality of communication links for the data communication, wherein the adaptive bonded communication link is configured to adapt to data communication requirements of the at least one user and to data communication characteristics of the plurality of communication links as the vehicle moves. The second utility is configured for: retrieving the electronic data from the data source; transmitting the electronic data in disassembled form through the adaptive bonded communication link to the first utility. The first utility is configured for: transmitting the electronic data to the at least one mobile device.

The adapting of the adaptive bonded communication link may be in real-time or near real-time, and is responsive to at least one of: (i) changes in the data communication requirements and (ii) changes in the data communication characteristics of the plurality of communication links.

The second utility may be implemented as a cloud-based shared resources platform.

The system may be configured to trigger the operation of one or more cloud-based resources based on at least one of (i) a demand for service and (ii) proximity to the vehicle.

The triggering may include instantiating an instance of the second utility.

The instance of the second utility may be instantiated at a location selected according to the location of the vehicle.

The plurality of communication links may include communication links utilizing at least one of (i) the transmission control protocol and (ii) the user datagram protocol.

The second utility may be configured to transcode the electronic data prior to transmission through the adaptive bonded communication link.

The second utility may be configured to encrypt the electronic data prior to transmission through the adaptive bonded communication link.

At least one of the first and second utilities may include an electronic datastore storing data records reflective of the data communication characteristics.

The data records may store historical data reflective of data communication characteristics of communication links along an expected travel route of the vehicle.

At least one of the first and second utilities may be configured to pre-fetch data at a location along the expected travel route, the pre-fetching in response to processing the historical data.

At least one of the first and second utilities may be configured to update the data records reflective of the data communication characteristics in response to received data.

The received data may include measurements obtained from at least one of the first and second utilities.

At least one of the first and second utilities may include an electronic datastore storing data records reflective of the data communication requirements.

At least one of the first and second utilities may be configured to update the data records reflective of the data communication characteristics in response to received data.

The received data may be received from a user.

The received data may reflect the embarking or disembarking of a user.

At least one of the first and second utilities may be configured to present an advertisement, an offer, or a service by way of the at least one mobile device.

The advertisement, offer, or service may be selected according to the location of the vehicle.

In a yet further aspect, there is provided a system for data communication across a plurality of communication links to and from a vehicle, involving at least one mobile device on the vehicle. The system includes one or more servers, each having a processor and one or more computer readable memories, the one or more servers providing a first utility located on the vehicle and a second utility located remotely from the vehicle. At least one of the first and second utilities is configured for: receiving a request, from the at least one mobile device, to transmit electronic data to at least one data recipient; identifying a plurality of communication links available to the vehicle; forming an adaptive bonded communication link using the plurality of communication links to aggregate throughput across the plurality of communication links for the data communication, wherein the adaptive bonded communication link is configured to adapt to data communication requirements of the at least one user and to data communication characteristics of the plurality of communication links as the vehicle moves. The first utility is configured for receiving the electronic data from the at least one mobile device; transmitting the electronic data in disassembled form through the adaptive bonded communication link to a second utility. The second utility is configured for: transmitting the electronic data to the at least one data recipient.

The first utility may be configured to transcode the electronic data prior to transmission through the adaptive bonded communication link.

The first utility may be configured to encrypt the electronic data prior to transmission through the adaptive bonded communication link.

In various further aspects, the disclosure provides corresponding methods, computer system products, and logic structures such as machine-executable coded instruction sets for implementing such products and methods.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

In the drawings, embodiments of the invention are illustrated by way of example. It is to be expressly understood that the description and drawings are only for the purpose of illustration and as an aid to understanding, and are not intended as a definition of the limits of the invention.

Embodiments will now be described, by way of example only, with reference to the attached Figures, wherein.

DETAILED DESCRIPTION

Figure 1:
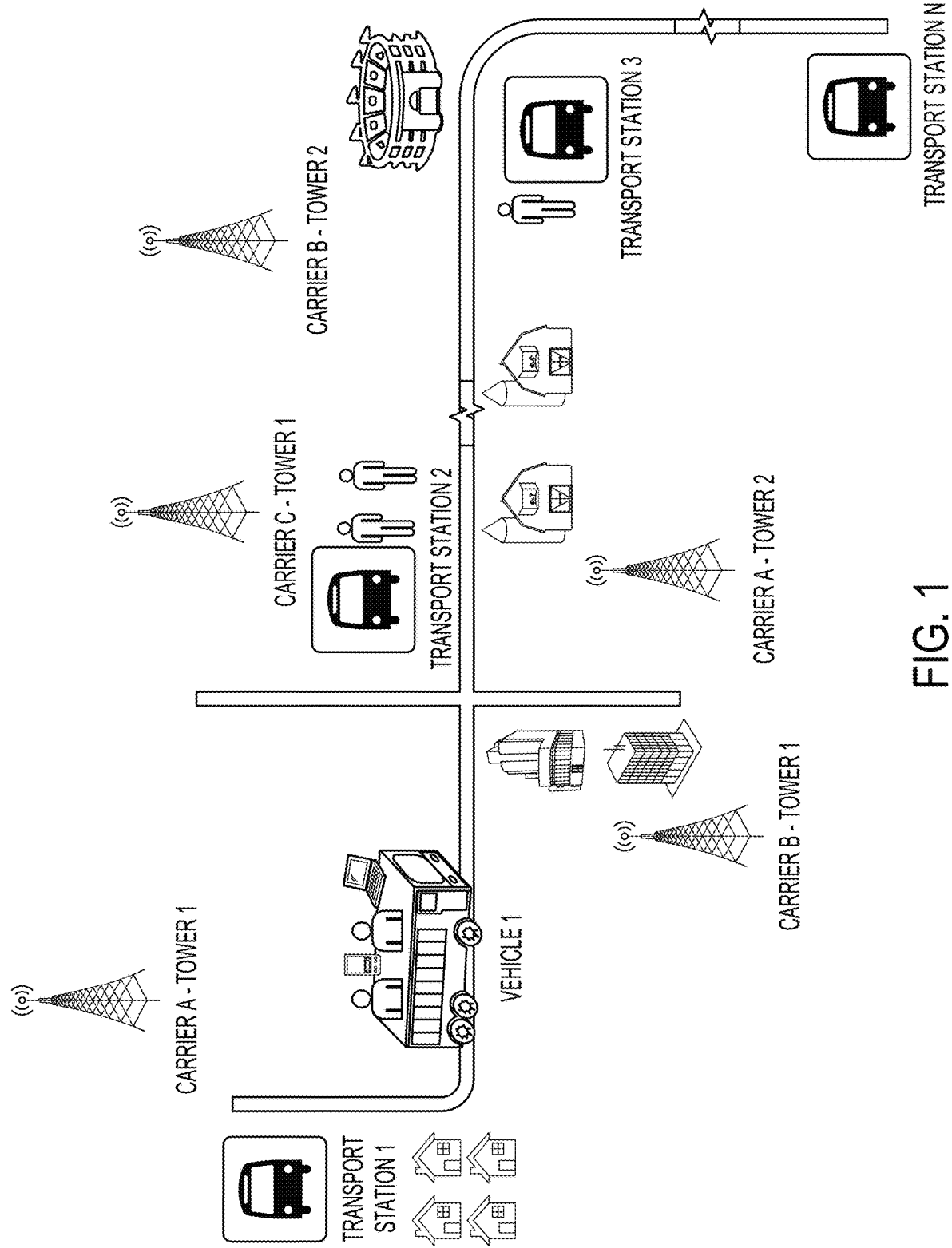
FIG. 1 is a schematic diagram providing an overview of a sample environment of a moving vehicle on a route with multiple stops and multiple carriers, according to some embodiments.

Embodiments of methods, systems, and apparatus suitable for use in implementing the invention are described through reference to the drawings.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

A system may be provided that that is configured to intelligently and adaptively combine the various communication links available to a vehicle. For example, the system may be aware of bandwidth availability relating to a given location, the composition of the vehicle's occupants (users), including for example, various passengers, operators, devices, services, etc., data communication preferences of the occupants, data communication requirements of the occupants, and the nature of the route being taken, among other information. The available links may be intelligently and adaptively allocated upon consideration of some or all of this information.

In an embodiment, the system may include a controller configured to form an adaptive bonded communication link for a vehicle, using the various communication links available to the vehicle, and aggregating throughput across the plurality of communication links for data communication by the occupants of the vehicle. The controller may configure the adaptive bonded communication link to adapt to changing conditions, e.g., changing data communication requirements/preferences, or changing data communication characteristics of the various communication links as the vehicle moves. The controller may configure the adaptive bonded communication link to adapt to such changes in real-time or near real-time. In an embodiment, the controller may reside in the cloud at a location remote from the vehicle, and may adapt the bonded communication link based on information received from the vehicle and other sources. In another embodiment, the controller may reside partly or wholly at the vehicle.

The communication links used to form an adaptive bonded communication link may be on the same network or different networks. These communication links may be operated by the same service provider or different service providers. These communication links may be accessible using the same radio access technology or different radio access technologies.

In provisioning and/or providing data services, such as Internet access, to users in transit, e.g., in a moving vehicle such as a bus or train, there may be a number of challenges which make it difficult to provide a consistent and reliable service to a large number of users in a cost effective manner.

For example, these challenges may include addressing one or more of: varying signal/spectral environments encountered during transit; unreliable hand-offs between signal towers; limited availability of wired and/or wireless access at stations; passengers with different data communication requirements embarking/disembarking a vehicle; activation/de-activation of data services and/or devices on the vehicle; unexpected changes in routes; limited availability of cellular signals; unreliability of networks; contention between the demands of various users; crossing of jurisdictional boundaries; data roaming considerations; co-location of vehicles, etc.

Some of these challenges may be particularly pronounced with certain types of data services, which may require significant amounts of consistently available bandwidth and/ or consistent network latency, such as video streaming, or have a minimum packet loss requirement.

The data communications demands may also vary depending on the type of communication, for example, some data communications may be tolerant to lost/out of order data packets (e.g., voice or video communications), while other communications may be significantly impacted by lost/out of order data packets (e.g., sending an executable file).

Additionally, there may be other data services for a vehicle (such as, e.g., security video, telemetry data, vehicle control data, television data, payment or other financial transaction data, etc.) which must be delivered and/or received at the vehicle. At least some of these data services may require data to be transmitted to/from the vehicle with various transmission requirements, e.g., high reliability, minimal packet loss, low latency, guaranteed delivery, etc.

Existing solutions may include the use of a single mobile Internet connection or shared round-robin access to a plurality of single mobile Internet connections. These Internet connections may be provided by the vehicle operator, which may be problematic due to the limited throughput that needs to be spread across numerous users. Even if users provide their own Internet connections, e.g., by way of mobile Internet sticks for accessing a cellular network, there may be issues related to contention for the bandwidth and variability of the data rates available through each stick. For example, the service provider providing the single mobile Internet connection may have poor coverage in a specific geographic area.

Additionally, there may be disruptions in service as the service switches connection points (e.g., cell towers) along the route.

A potential solution to these problems is a bonding/de-bonding system where multiple communication links are combined together in an intelligent and adaptive manner, as detailed herein, to provide improved data communication services. The system may be configured to prioritize and/or combine available communication links in various ways that take into consideration the requirements and characteristics of data communications at the vehicle (e.g., by the users and their mobile applications), and thereby balance communications needs according to available resources and network conditions. The system may take into consideration this information in real-time or near-time (e.g., based on real-time measurements of network conditions, or real-time predictions of user data communication requirements) to adaptively prioritize and/or combine available communication links.

For example, the system may be configured to re-adjust the use of available communication links dynamically (e.g., in real-time or near real-time), as the characteristics of those links may change over time (e.g., a vehicle enters a train station; enters a new jurisdiction; enters/exits range of a signal tower; people enter/exit the vehicle). In some cases, the quality of links may change over time. In some cases, new links may become available (e.g., as the vehicle moves into range), or existing links may become unavailable (e.g., as the vehicle moves out of range).

In some embodiments, the system may modify the quality and/or nature of services provided to users depending on existing and/or predicted bandwidth availability of various communication links, and existing and/or predicted bandwidth requirements from the users.

In some embodiments, the system may also take into consideration that the services may need to be maintained across a fleet of vehicles (such as a fleet of taxis or buses), which may intermittently be co-located (relative to available bandwidth providers, such as cellular towers or Wi-Fi hot-spots), creating conflict over bandwidth usage during particular periods, the precise timing of which may depend on route scheduling and real-time traffic conditions.

In some embodiments, the system may be configured to transcode signals/data such that the overall size of a communication may be reduced prior to transmission to a user in a vehicle. For example, the system may be configured for compression, bitrate reduction, etc., to reduce the overall bandwidth usage.

In some embodiments, the system may be configured to cache signals/data (e.g., at the vehicle or in the cloud) for re-use. For example, content data expected to be accessed by multiple users or accessed multiple times may be cached, thereby reducing the overall bandwidth usage.

The system may include one or more bonding components configured to bond communication links to form a bonded communication link. Communication links may be bonded in manners similar to that described in U.S. Pat. No. 8,873,560 to Frusina and Horvath (hereinafter referred to as the '560 patent) or in U.S. Pat. No. 8,984,576 to Sze et al. (hereinafter referred to as the '576 patent), the contents of both are hereby incorporated by reference. For example, the system may split data communication into multiple data streams transmitted in disassembled form over multiple communication links by way of multiple radio frequency (RF) interfaces (e.g., modems). Such disassembly may include, for example, transmitting packets from one data source over multiple RF interfaces, transmitting packets out of order, transmitting redundant packets, re-transmitting missing packets, computing and transmitting forward error correction (FEC) data, etc.

The system may also include one or more complimentary de-bonding components configured to allow data communications over a bonded communication link to be re-assembled or otherwise reconstituted for use once transmitted through a bonded link. Such re-assembly may include, for example, re-ordering data packets, reassembling data packets, re-requesting missing data packets, re-computing missing packets based on FEC data, etc.

The system may include one or more servers having one or more processors, operating in conjunction with one or more computer-readable storage media, configured to provide backend services, such as data processing, data storage, data backup, data hosting, among others.

In some embodiments, the system (e.g., one or more of its servers) may be partially implemented using a set of distributed computing devices connected through a communications network. An example of such a set of distributed computing devices would be what is typically known as a "cloud computing" implementation. In such a network, a plurality of connected devices may cooperate to provide services through the use of their shared resources.

A cloud-based implementation for provisioning bonded communication links may provide one or more advantages including: openness, flexibility, and extendibility; being manageable centrally; reliability; scalability; selectable geographic location, which may reduce data communication latency; being optimized for computing resources; having an ability to aggregate information across a number of users; and ability to connect across a number of users.

An additional advantage of cloud-based computing is the ability to provision and/or de-provision resources and instances as necessary, for example, provisioning resources that may be advantageously proximate (e.g., closer geographically, and/or having lower latency) to a vehicle as it traverses a path, and then de-provisioning those resources as the vehicle enters the proximity of another instance. In some embodiments, a cloud-based computing implementation may be configured to provision and de-provision instances in an automated manner, e.g., based on pre-defined or adaptive rules.

While embodiments and implementations of the present invention may be discussed in particular non-limiting examples with respect to use of the cloud to implement aspects of the system platform, a local server, a single remote server, a software as a service platform, or any other computing device may be used instead of the cloud.

FIG. 1 is a schematic diagram providing an overview of a sample environment of a moving vehicle on a route with multiple stops and multiple network carriers, according to some embodiments.

In this example, the vehicle 1 may travel along a route from transport station 1 to transport station N, stopping at transport stations 2, 3, and so on, along the way. At each of these stations, various users may embark or disembark.

During the course of its travel, the vehicle 1 may variously enter and exit the range of various network access points (e.g., cellular, WiFi, etc.) through which communication links may be established. In the depicted embodiment, vehicle 1 variously enters and exits the range of various cellular networks provided by respective signal towers. The signal towers and networks may belong to various carriers (i.e., service providers), in this example, denoted as carriers A-C. Each of these carriers may have separate networking policies, available bandwidth, networking technologies, and/or associated costs. In some embodiments, the carriers may also charge roaming fees. During the course of its travel, vehicle 1 may be within the range of multiple signal towers contemporaneously. Such multiple signal towers may belong to the same carrier, or to different carriers.

The vehicle 1 may not always be within range of a signal tower; there may be times when no signal tower can reach vehicle 1.

The spectral environment surrounding the vehicle 1 may also change, as the environment surrounding the vehicle 1 may vary due to landscape features, buildings, weather patterns, interference from other users and/or devices, etc.

The vehicle may, in some embodiments, be associated with or have various sensors such as proximity sensors, photo sensors, sonar sensors, gyroscopes, near-field communications sensors, ambient light sensors, force sensors, location sensors, cameras, radio-frequency identification sensors, humidity sensors, temperature sensors, capacitive sensors, resistive sensors, radar sensors, and surface acoustic wave sensors, among others.

The sensors may be of various models, makes and functionalities. For example, the sensors may vary in model, specifications and in quantity between generations and particular brands.

Further, the vehicle may be part of a fleet of other vehicles, part of a dispatch network, part of a remotely managed vehicle network, etc.

The vehicle may have network connectivity through a variety of technologies, such as cellular connectivity, wired connectivity, wireless connectivity, near-field technologies, short range telecommunications technologies (e.g., Bluetooth™ or WiFi), satellite connections, etc. The vehicle may be able to connect to networks directly, or indirectly, through communications with other vehicles and/or through communication networks associated with fixed infrastructure, such as transport stations, parking lots, and depots.

In an embodiment, the vehicle may connect to one or more networks indirectly by way of an associated airborne relay. For example, modems and/or other system components for establishing communication links to one or more networks may be provided at a location away from the vehicle, e.g., at an associated airborne vehicle. Such an airborne vehicle may, for example, be an aerial drone, a balloon, a blimp, a helicopter, or the like. The airborne vehicle may be located within a short-range (e.g. WiFi range) of the main (passenger-carrying) vehicle and its users, and may relay data communication between the main vehicle and the one or more networks. So, the adaptive bonded communication link as described herein may be formed in part through links provided by one or more of such airborne vehicles.

Referring again to FIG. 1, the transport stations 1 . . . n may also have varying levels of network connectivity; each station may have access to wired networking infrastructure, wireless networking infrastructure, etc. There may also be additional contention for services in more busy and/or more populated areas, for example, a crowded bus station having a multitude of buses and/or users may have many users accessing the same networks for connections.

There may be other networks available to vehicle 1 beyond those depicted in FIG. 1, such as communications with other vehicles, wired connections at the stations, satellite communications, etc.

Figure 2:
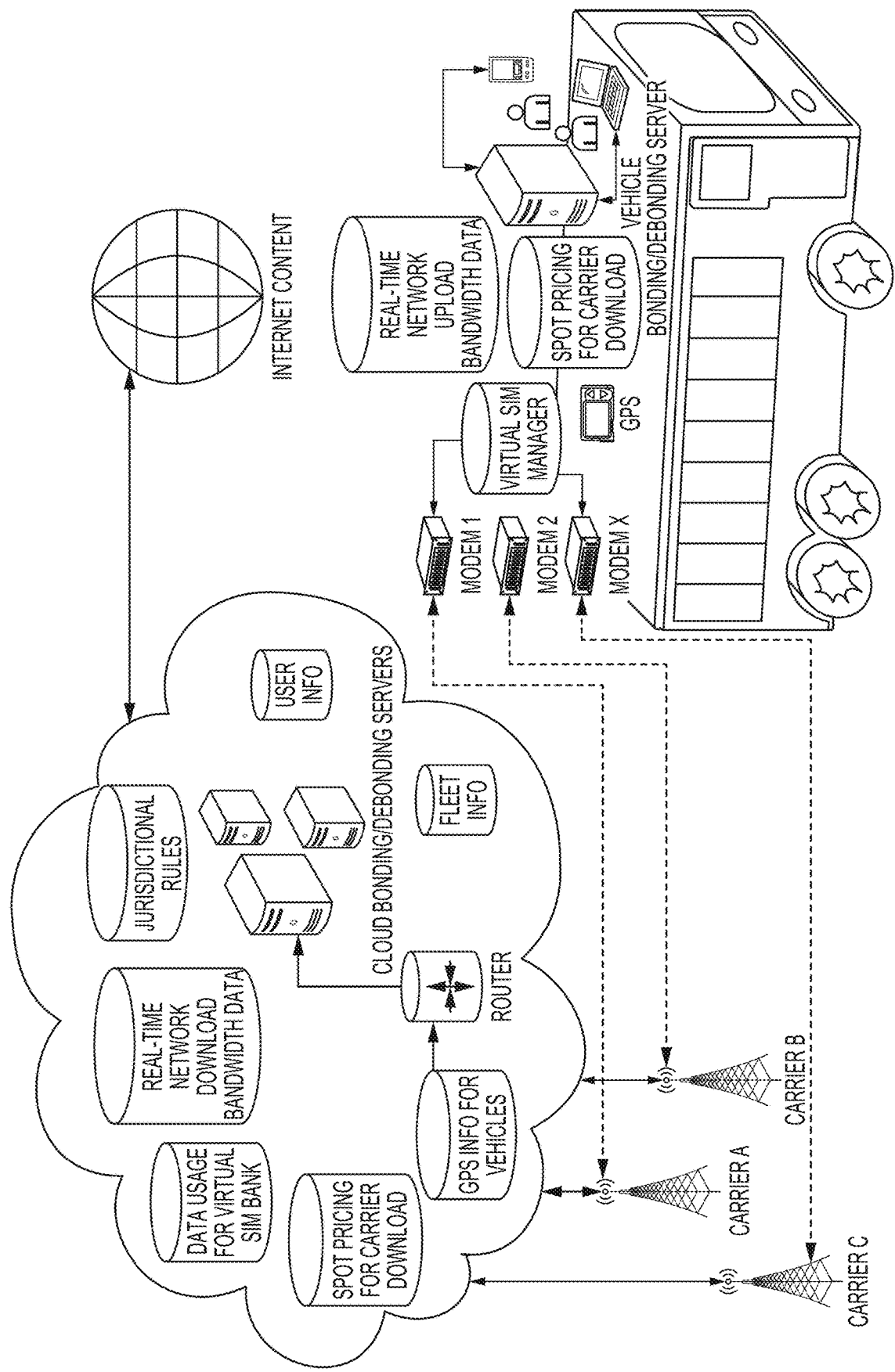
FIG. 2 is a schematic diagram of a communication system configured to provide communications for a vehicle, according to some embodiments.

FIG. 2 is a schematic diagram of a system configured to provide communications for users in transit, e.g., by way of a vehicle, according to some embodiments.

As depicted, a vehicle bonding/de-bonding server may be provided on a vehicle, and a complementary bonding/de-bonding server may be provided off the vehicle.

The vehicle bonding/de-boding server may be, in some embodiments, be implemented as one or more devices located on the vehicle. The complementary bonding/de-bonding server may, in some embodiments, be implemented as a cloud-based distributed networking solution. In some embodiments, the complementary bonding/de-bonding server may be implemented as a fixed set of devices residing at a particular physical location. The complementary bonding/de-bonding server may be configured to transmit/receive information from the Internet, or any other external network.

The vehicle bonding/de-bonding server and the complementary bonding/de-bonding server may be configured to cooperatively form and maintain adaptive bonded communication links for data communication between the vehicle bonding/de-bonding server and the complementary bonding/de-bonding server.

The vehicle bonding/de-bonding server and the complementary bonding/de-bonding server may be configured to interoperate with one another to communicate information between the vehicle and the external network through transmission over the adaptive bonded communication links between the vehicle bonding/de-bonding server and the complementary bonding/de-bonding server.

The vehicle bonding/de-bonding server may be configured to form and maintain an adaptive bonded communication link using a plurality of available communication links between the vehicle bonding/de-bonding server and a complementary bonding/de-bonding server. The adaptive bonded communication link may be used to distribute data communications over one or more of the available communication links.

Data communications may be distributed over the available communication links based on one or more factors including, e.g., costs involved with using particular communication links (including network costs and/or monetary costs), spot pricing, overage pricing (e.g., on individual modems), available data remaining on a plan (e.g., on individual modems), available data before overages charges apply (e.g., on individual modems), available bandwidth (measured and/or predicted), bandwidth usage (measured and/or predicted), priority level of the communication, type of communication, user preferences (e.g., tolerance for costs), user status, network conditions (e.g., latencies, reliability of the communication link), data transmission requirements (e.g., bandwidth required, latency required), weather information, routing information, information about the vehicle's location (via the vehicle's GPS), etc.

Data communications may be distributed over the available communication links based on combinations of the various factors, e.g., such as indications as to a best path based on a weighted combination of cost, packet loss rates, connection throughput, and latencies which may be expressed as predefined or adaptive rules.

Data communications may be distributed over the available communication links based on historic data (e.g., stored at the complementary bonding/de-bonding server, or at the vehicle bonding/de-bonding server) or data received in real-time or near real-time (e.g., periodically or in response to a latest connection request).

In an embodiment, the system may be configured to measure data communication characteristics (e.g., latency, packet loss rates, throughput, etc.). Such characteristics may be measured at one or both of the vehicle bonding/de-bonding server and the complementary bonding/de-bonding server.

In an embodiment, the system may be configured to store historic data of data communication characteristics, e.g., for communication links along an expected travel route of the vehicle.

By using data retrieved in real-time or near-time time, bonded communication links may be provided that adapt to changing usage scenarios and/or network conditions as the vehicle moves from location to location.

In some circumstances, e.g., when the bandwidth requirements are low, a single communication link may be used to service a user's data communications. In such circumstances, bonding/de-bonding is not required. However, user data may still flow between the vehicle bonding/de-bonding server and the complementary bonding/de-bonding server in manners described herein.

In some embodiments, distribution of data communications over available communication links may vary from user to user (e.g., based on requirements or preferences of that user), from application to application, from time to time, etc. Of course, distribution over the links may also vary as availability and/or performance of links changes during travel.

As noted, bonded communication links may be formed from a plurality of communication links that may be established between the vehicle bonding/de-bonding server and the complementary bonding/de-bonding server. These communication links may be established through various networking technologies and/or topologies, and may include, for example, wired networks, wireless networks, satellite communications, various types of radio frequency communications, etc., as may be available at the vehicle's location.

In some embodiments, there may be communications used for emergencies, the transferring of critical vehicle information, etc. These transferrings may be prioritized, and the system may be configured such that these communications are provided preferential access and/or bandwidth from the set of available communication links.

In some embodiments, when suitable communication links are not available between the vehicle bonding/de-bonding server and the complementary bonding/de-bonding server, certain types or classes of data (e.g., guaranteed-delivery data) may be buffered at one or other of the vehicle bonding/de-bonding server for transmission at a later time when a suitable communication link becomes available.

In some embodiments, the vehicle bonding/de-bonding server may include or be coupled to one or more local caching servers on the vehicle (e.g. a caching HTTP proxy, a Content Delivery Network (CDN) node, a "walled garden" content library, etc.). In such embodiments, when no communication links are available between the vehicle bonding/de-bonding server and the complementary bonding/de-bonding server, user requests at the vehicle for at least certain types or classes of data may be fulfilled by one or more local caching servers.

In some embodiments, a user may be presented with a series of options, such as, e.g., what services may be available (either free or purchased) for a particular device (e.g., the options for a laptop may be different than those available for a WiFi-enabled music player with limited display or compute capability). Such options may be presented to the user by way of a graphical user interface (e.g., on a webpage, or a custom application/"app") presented on the user's device (e.g., computer or mobile phone).

In some embodiments, the options presented to particular users may depend on their status (whether a user has a "premier" status, which grants priority access to data services), and/or on the current or expected conditions of the network for the duration of a user's trip on the vehicle, which may also take into account the expected usage of the other users which may be on the vehicle. The user may commence using data communications (e.g., basic web surfing, to music/movie streaming, to two-way video conferencing) by requesting data content.

Based on the expected and/or actual bandwidth availability, the system may be configured to determine and/or only allow those services for which an appropriate level of service, e.g., a sufficiently high Quality of Service (QoS) metric, may be provided. For example, when the vehicle is travelling through a rural area with poor cellular connectivity, users may be alerted that there is insufficient signal to support high quality video streaming. In some embodiments, the system may be configured to actively prevent users from utilizing these types of services, to throttle such services, and/or to transcode requested content into less bandwidth intensive content (e.g., reducing the bitrate on an audio file being streamed). In some embodiments, the system may be configured to download and buffer (cache) content (e.g., pre-fetch the data to the vehicle bonding/de-bonding server) to be provided to the user when desired.

In some embodiments, the system may be configured to process historical data, e.g., reflecting network connectivity and bandwidth availability, to determine when data should be pre-fetched. For example, the system may schedule the download of data to occur before the vehicle reaches a region where network connectivity is expected to be poor and/or available bandwidth is expected to be low. This data may then be provided to the user when the vehicle is in that region.

In some embodiments, the system may be configured to allow users to activate or deactivate pre-fetching of their data.

In some embodiments, a particular complementary bonding/de-bonding server for use with particular communications may be selected from one of many available servers. The particular complementary bonding/de-bonding server may be selected based on its geographic location relative to the vehicle, or latency of communication to the vehicle. For example, the complementary bonding/de-bonding server may be selected to closer to the vehicle, or to provide lower latency to the vehicle.

For example, traffic to/from a bus travelling on the East coast of the United States will not likely be routed through a complementary bonding/de-bonding server in Asia.

Where the complementary bonding/de-bonding server is implemented using cloud computing shared resource principles, a server may be provided that has various favorable characteristics, such as lowest spot price, low latency, free capacity, distance to vehicle, etc. In some embodiments, a complementary bonding/de-bonding server may be provisioned on demand where it otherwise would not have been, or an additional instance of a complementary bonding/de-bonding server is created using distributed resources.

In some embodiments, the complementary bonding/de-bonding server may be provisioned at locations in the cloud that change as the vehicle moves, e.g., to follow the vehicle.

In some embodiments, the complementary bonding/de-bonding server may be provisioned at a location where it has access to restricted-access resources (e.g. a corporate LAN). Such embodiments may be used, for example, in association with a vehicle that has been chartered for private use (e.g. a corporate shuttle bus, where employees need access to the corporate LAN while riding the shuttle). Some embodiments may also be used, for example, when the vehicle requires restricted-access resources of the vehicle operator (e.g., to retrieve confidential passenger data from a vehicle operator server).

In some embodiments, multiple complementary bonding/de-bonding server may be provisioned to provide a seamless handoff (e.g., transparent to the user) when transitioning from one complementary bonding/de-bonding server to another complementary bonding/de-bonding server. In one example, a vehicle (e.g., a bus) may be traveling from the East coast of the United States to the West coast of the United States.

Initially, a vehicle bonding/de-bonding server located on the vehicle may be connected to a complementary bonding/de-bonding server located proximate the East coast (e.g., proximate to the vehicle's starting point and providing a low latency thereto). However, as the vehicle travels, the vehicle may become more proximate to another complementary bonding/de-bonding server located in the West coast (e.g., providing lower latency than the initial complementary bonding/de-bonding server). In this case, the vehicle bonding/de-bonding server may establish a connection to the West coast complementary bonding/de-bonding server such that it may be concurrently connected to both the East coast and West coast complementary bonding/de-bonding servers.

Any new data communication requests from users may be serviced using connections made through the West coast complementary bonding/de-bonding server. Meanwhile, existing/old (legacy) connections for users' data communication requests may be maintained through the East coast complementary bonding/de-bonding servers. Such legacy connections may be maintained until they are no longer required (e.g., when mobile applications using those connections are closed naturally). The vehicle bonding/de-bonding server may fully disconnect from the East coast complementary bonding/de-bonding server once all user connections through the East coast complementary bonding/de-bonding server have been terminated.

In some embodiments, a seamless handoff from one complementary bonding/de-bonding server to another may be provided for a live/existing user connection while maintaining that connection. In one example, an HTTP connection may be handed off using HTTP byte range request headers. In this example, a first complementary bonding/de-bonding server may transmit a portion of an HTTP message to the vehicle and a second complementary bonding/de-bonding server may transmit another portion of the HTTP message to the vehicle. In another example, a live/existing user connection may be handed off using virtual machine infrastructure (e.g. VMWare vMotion™). In this example, a first complementary bonding/de-bonding server and second complementary bonding/de-bonding server may each host an instance of a virtual machine, and the live/existing user connection is handed off from the first virtual machine instance to the second virtual machine instance in manners transparent to the user.

In some embodiments, seamless handoff may occur not due to vehicle movement, but to balance load (e.g. CPU, network resources) amongst complementary bonding/de-bonding servers or to optimize cloud computing costs.

The selected complementary bonding/de-bonding server may be configured to receive user requests for data communication (e.g., to upload and/or download data). So, the complementary bonding/de-bonding server may be configured to retrieve data requested by a user from a remote data source (e.g., an Internet data source) and transmit the data to the user by way of a bonded communication link. Similarly, the complementary bonding/de-bonding server may be configured to receive data for upload by the user, and transmit the data to a remote data recipient (e.g., an Internet data recipient).

Further, one or both of the vehicle bonding/de-bonding server and the complementary bonding/de-bonding server may be configured to refer the user request to a database of rules relating to the jurisdictional rules covering the jurisdiction that the vehicle is in at the time of the request, and grant or deny the continued pursuit of the content on that basis.

For instance, the user may be making a request to an online gambling site when they are in a jurisdiction in which such behavior is prohibited. While such rules may be location based, they may also be based on other factors such as the vehicle's operator prerogative (e.g., blocking a competitor's website) or on a user defined/related parameter (e.g., denial of objectionable material to underage users).

In an embodiment, the particular communication links to be used for particular content may be selected to avoid certain non-preferred jurisdictions or to transmit communications through certain preferred jurisdictions. For example, a jurisdiction may be classified as a non-preferred jurisdiction if that jurisdiction permits examination of data communications in manners that intrude on user privacy, or if the cost of accessing content is more expensive in that jurisdiction (e.g., due to licensing arrangements or network access costs), or if certain types of content are prohibited in that jurisdiction, as detailed below. Conversely, a jurisdiction may be classified as a preferred jurisdiction if that jurisdiction includes laws protecting user privacy, if content costs are lower, or if certain types of content are permitted in that jurisdiction, or if certain types of content are only accessible in that jurisdiction.

In some embodiments, the complementary bonding/de-bonding server may be configured to transcode content for efficient delivery over a bonded communication link to the vehicle.

In some embodiments, the complementary bonding/de-bonding server may identify content for transcoding based on the location of the vehicle, the nature of the user's device, the nature of the content, available bandwidth in the plurality of available links, the individual and/or aggregate reliability of the plurality of available links and any parameters supplied by the user.

Transcoding may include various activities, such as encoding from one bitrate to another, applying a compression technique, cropping images and/or videos, etc. For example, the complementary bonding/de-bonding server could decode video content requested (e.g., a high resolution, high bitrate video from a video sharing website), and re-encode it at a lower resolution and lower bitrate in order to increase probability of successful delivery (in case of delivery of live video where buffering is not desired) or to reduce amount of data transmitted. In some embodiments, transcoding may be performed in real-time or near real-time, e.g., in the case of live streaming audio or video.

In some embodiments, the complementary bonding/de-bonding server may selectively encrypt data based on the location of the vehicle, the available data links, user requirements, the nature of the content, etc. For example, the complementary bonding/de-bonding server may encrypt data if the data will be transmitted through links in a jurisdiction that lacks privacy protection laws, or if the data will be transmitted through links in a jurisdiction that requires that data to be transmitted in encrypted form.

In some embodiments, one or both of the vehicle bonding/de-bonding server and the complementary bonding/de-bonding server may manage the transport of content depending on the type of traffic. For example, the transport mechanism between the vehicle and the cloud may involve protocols including, but not limited to, UDP or multipath TCP depending on the nature of the content request being made by the user. So, for example, the bonding/de-bonding may be UDP-based bonding/de-bonding, TCP-based bonding/de-bonding, or both at the same time, as may be managed according to pre-defined or adaptive QoS rules.

Once the various portions of the data (e.g., data packets) are delivered to the vehicle from the complementary server, they may be re-assembled/de-bonded at the vehicle server and then transmitted to a user's device. Similarly, once various pieces of the data are delivered from the vehicle server to the complementary server, they may be re-assembled/de-bonded at the complementary server and then transmitted to its ultimate destination (e.g., an Internet server).

FIG. 2 depicts a communication system having an optional virtual subscriber identity module (SIM) manager on the vehicle, exemplary of an embodiment. The virtual SIM manager may interface with modems 1 . . . x, which may be in communication with signal towers associated with carriers A, B, and C. These signal towers may provide communication links with the complementary bonding/de-bonding server in a cloud-based implementation, which then connects to the Internet. The virtual SIM manager allows different SIM information relating to network access, data plans, roaming plans, etc. to be loaded to a virtual SIM of a particular modem for communication over the plurality of available links. In this way, the virtual SIM may be dynamically reconfigured with SIM information. There may be differing costs associated with carriers A, B, and C, and also with the particular jurisdictions in which they operate. For example, roaming charges may be incurred depending on whether the data charges are incurred using a SIM registered to a local account, or to an account in a non-local jurisdiction. Further, each of the carriers may charge differing costs based on the policies of each carrier and the service level provided. In the case where there are multiple jurisdictions, differing levels of taxes may also apply to telecommunications services.

In some embodiments, the virtual SIM manager may be configured to connect to networks in various jurisdictions and related to various carriers and generate SIM information to register with these networks as a local entity. A potential advantage to such an implementation is the reduction of costs associated with roaming networks. Another potential advantage to such an implementation is that a SIM with a data plan purchased in a discrete transfer quantity or with a data transfer limit may be more fully utilized, while avoiding overage charges. Further, the virtual SIM manager may also be able to generate connections on a plurality of network connections having different SIM information.

In some embodiments, one of more of the modems 1 . . . x of FIG. 2 may include multiple SIMs. Each of these SIMs may be registered to a different jurisdiction such that roaming charges apply to various ones of the SIMs in different geographic regions. Further, each of the SIMs may have a separate data transfer limit under an associated data plan, and thus the total data transfer limit available to a modem may be the aggregate transfer limit available through the multiple SIMs. In such embodiments, the communication system may include a management utility that allows for automated selection of a particular one of the SIMs. For example, the management utility may select a particular SIM having the lowest cost for a particular geographic region, or may select a particular SIM having available bandwidth under an associated data plan.

As used herein, the term "communication link" corresponds to a link available through a particular modem, through a particular SIM, or through a virtual SIM configured with particular SIM parameters. So, for example, selection of a particular communication link may correspond to selection of a particular modem, a particular SIM, or particular set of SIM parameters for a virtual SIM.

The complementary bonding/de-bonding server may, in communicating data information with the external network, apply various rules based on information, such as information associated with one or more vehicles, information associated with users (e.g., a user profile, user settings), jurisdictional rules (e.g., restrictions on content, such as pornography sites or gambling sites), advertising information, carrier spot pricing, historical usage information, historical connection information, route information, current data usage, etc.

Figure 3:
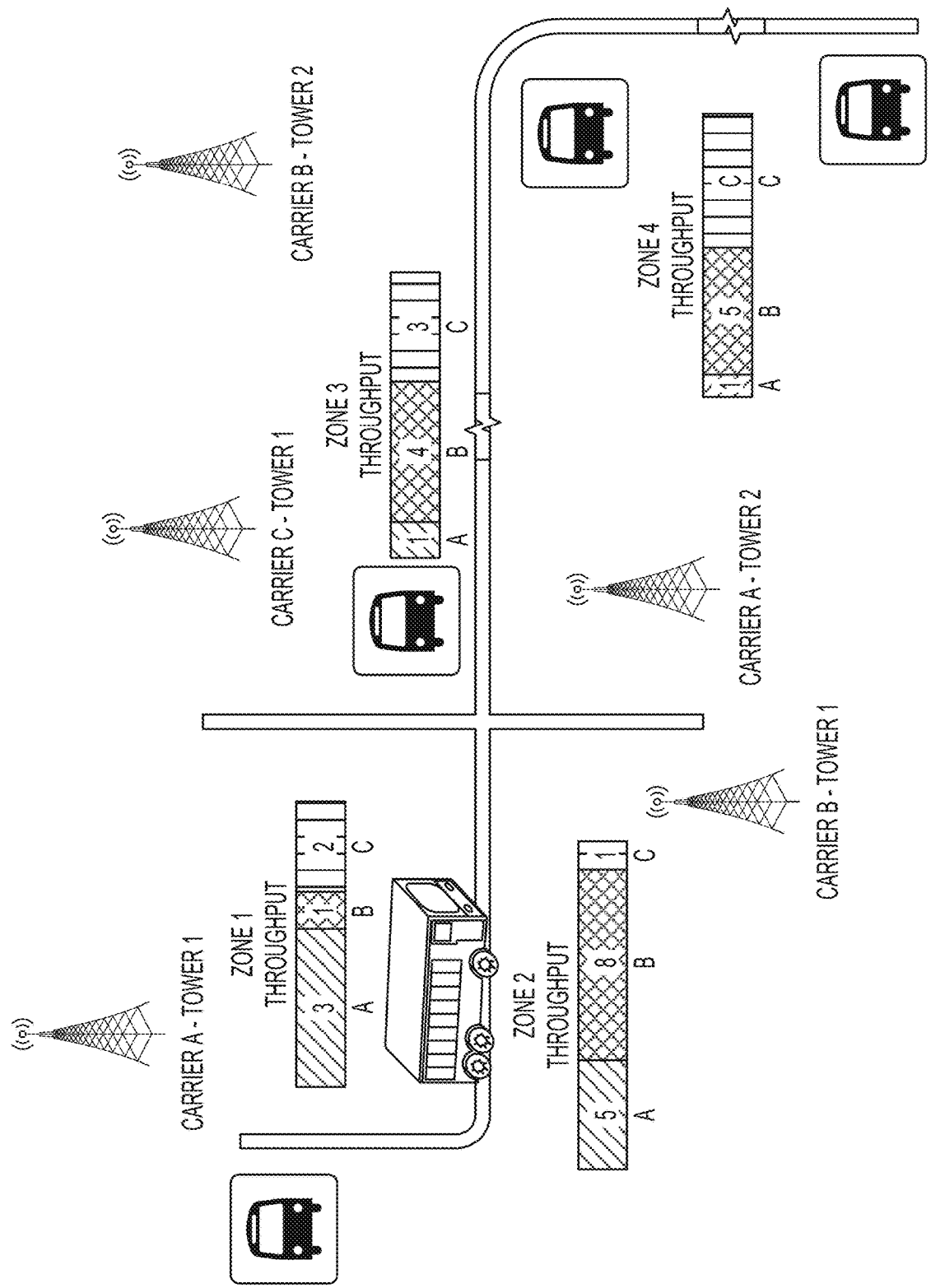
FIG. 3 is a graphical representation of the vehicle travelling across a route where the throughput in the communication links varies as the vehicle moves from one position to another, according to some embodiments.

FIG. 3 is a graphical representation of an example environment through which a vehicle may travel when using an adaptive bonded communication link formed from the plurality of available links and maintained in manners detailed herein. The vehicle is shown travelling across a route where the throughput in the communication links varies as the vehicle moves from one position to another, according to some embodiments.

In this particular example, as the vehicle is in zone 1, due to its proximity to tower 1 (associated with carrier A), there is a stronger signal to Carrier A (3 units), a weak signal to Carrier B (1 unit) and a medium signal to Carrier C (2 units). Similarly, differing units of signal are provided as examples as the vehicle travels through Zones 2-4. The associated bandwidth and/or latency may vary as a result of a number of factors, such as signal strength, amount of contention for limited resources in an area, spectral issues (e.g., signal interference, signal blocking, signal penetration, etc.).

The system may be configured to monitor, predict, and/or track these data communication characteristics, in association with each zone, each tower, and/or each carrier.

Accordingly, an adaptive bonded communication link may be formed and maintained, for example, taking into account the above-noted data communication characteristics of the depicted environment.

Figure 4:
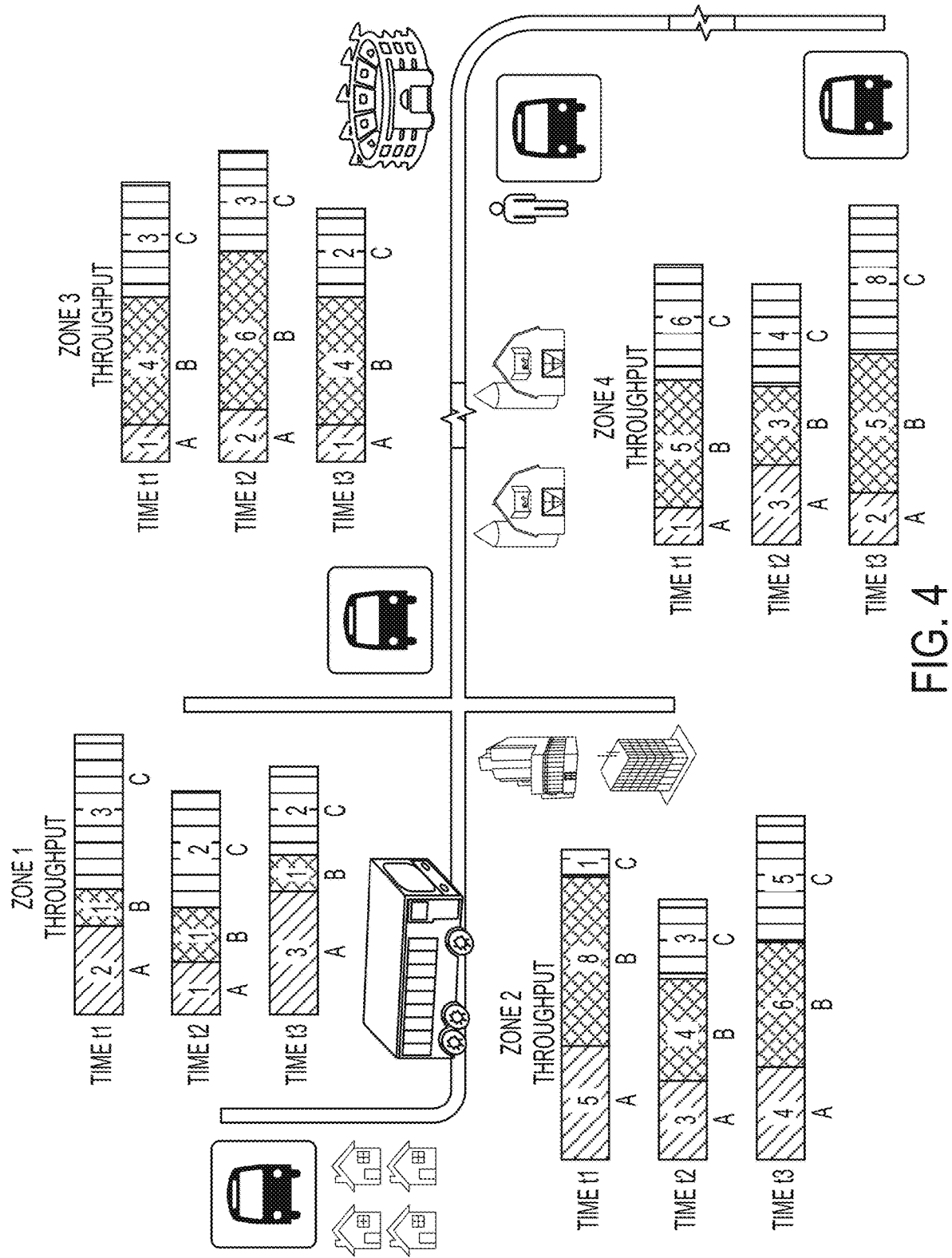
FIG. 4 is a graphical representation of the vehicle travelling across a route where the throughput in the available communication links varies as the vehicle moves from one position to another, and also varies depending on the particular time that a vehicle is in an area, according to some embodiments.

FIG. 4 is a graphical representation of another example environment through which a vehicle may travel when using an adaptive bonded communication link formed and maintained in manners detailed here. The vehicle is shown travelling across a route where the throughput in the communication links varies as the vehicle moves from one location to another, and also varies depending on the particular time that a vehicle is in an area, according to some embodiments.

Bandwidth may vary at different times due to various reasons, such as congestion and contention at peak times of the day, availability of cellular services, availability of channels, the presence of weather-related factors, the operation of the signal towers, etc. For example, it may be the case that along the same route (e.g., Boston to New York), the network capacity could be different at different places on the route, and the "capacity profile" might be different for the bus leaving at 7:00 AM and the bus leaving at 9:00 AM.

The system may be configured to monitor, predict, and/or track the general network capacity available to the vehicle, and compare this to demands placed on the network by others not in the vehicle, or others on the vehicle.

Accordingly, an adaptive bonded communication link may be formed and maintained from the plurality of available links, for example, taking into account the above-noted data communication characteristics of the depicted environment.

Figure 5:
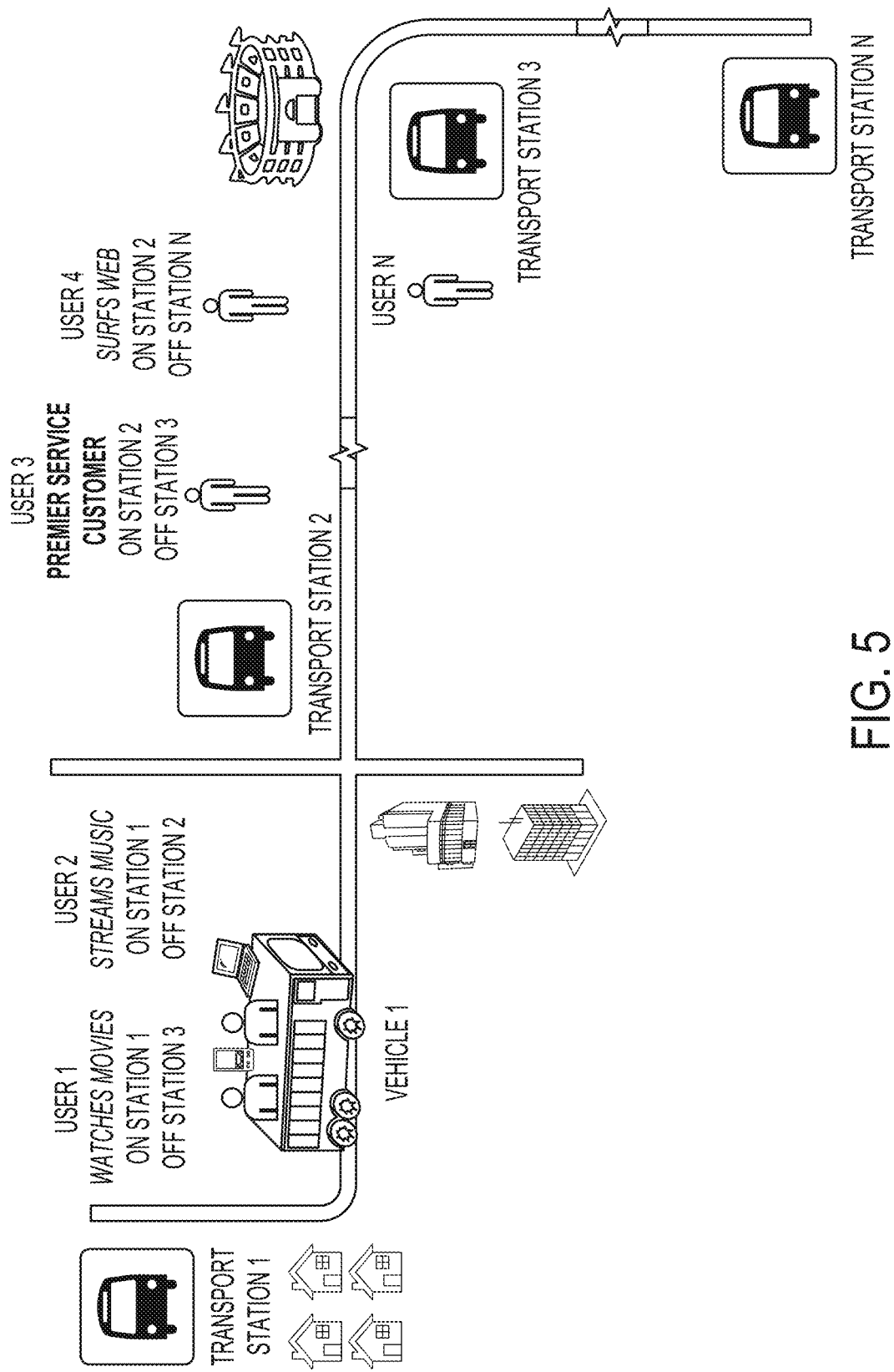
FIG. 5 is a representation of the vehicle travelling across a route, where a number of users embark and disembark the vehicle, having varied requirements for data communications, according to some embodiments.

FIG. 5 is a graphical representation of yet another example environment through which a vehicle may travel when using an adaptive bonded communication link formed and maintained in manners detailed here. The vehicle is shown travelling across a route, where a number of users embark and disembark the vehicle, having varied requirements for data communications, according to some embodiments.

In this example, vehicle 1 travels from transport station 1 to transport station N, stopping off at transport stations 2 and 3 along the way. At transport station 1, users 1 and 2 embark the vehicle. At transport station 2, user 2 disembarks and users 3 and 4 embark the vehicle. Various users N will embark at transport station 3, and users 1 and 3 will also disembark at transport station 3.

Each of the users may utilize one or more services that require data communications. For example, user 1 may be watching a movie, user 2 may be streaming music, and user 4 may be accessing various webpages. Further, user 3 may be a customer who has paid for a higher level of service, and is thus denoted as a "premier service customer".

The system may provide varying levels of and/or quality of service for data communications for these users based on various factors, such as the available communication links, the current route the vehicle is taking, the spectral environment in which the vehicle is travelling through, the expected embarkation and disembarkation of the users, the types of services requesting data communications, the service level associated with a particular user (such as the "premier service customer" tier), etc. The system may anticipate demand (for a given vehicle) based on the particular users on the vehicle, and what their usage is likely to be given the user's past usage. Such anticipated demand may also be based on time of use.

Accordingly, an adaptive bonded communication link may be formed and maintained, for example, taking into account the above-noted usage characteristics.

Figure 6:
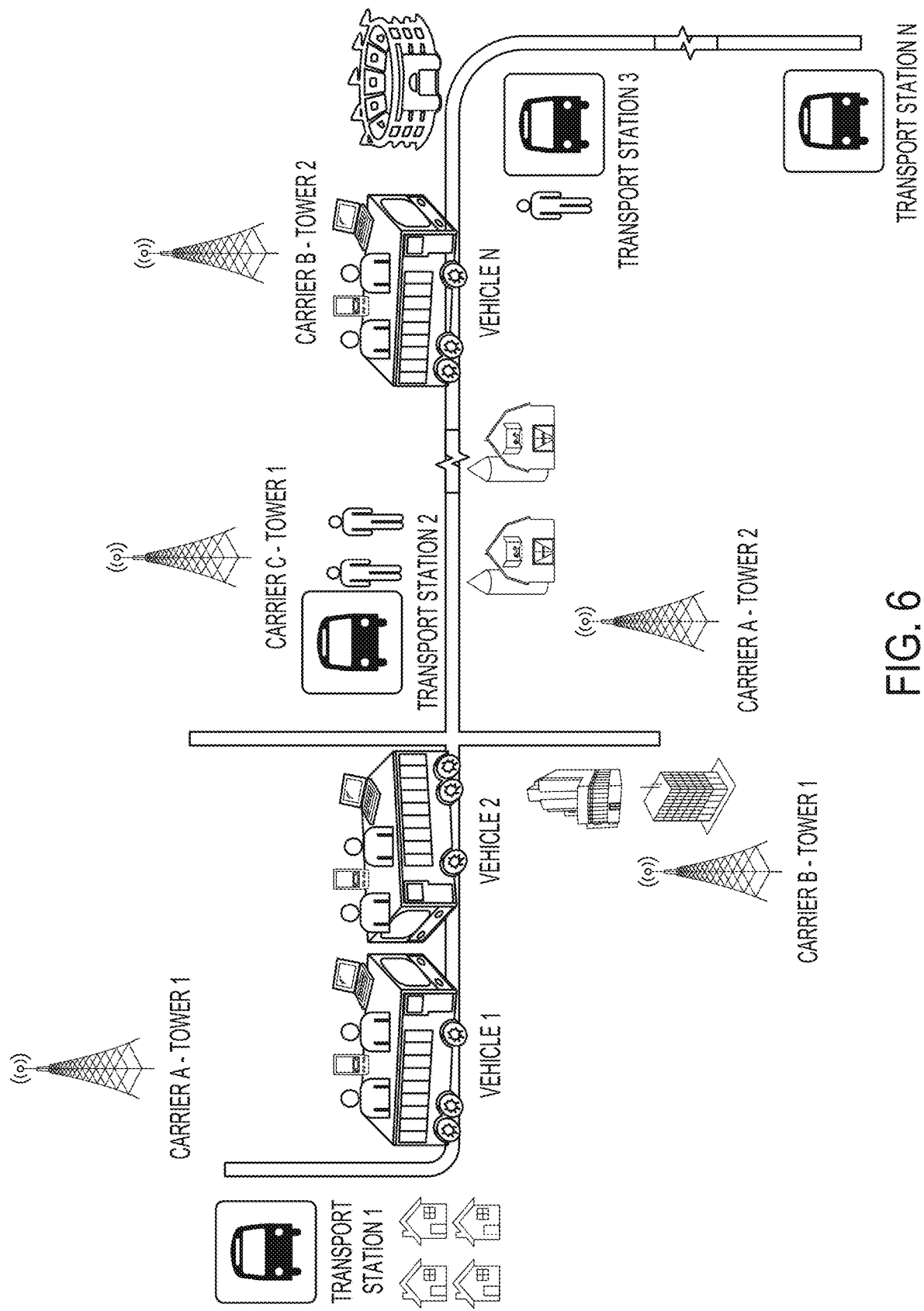
FIG. 6 is a representation of a number of vehicles travelling across a route, where a number of users embark and disembark the vehicle, and have varied requirements for data communications, according to some embodiments.

FIG. 6 is a graphical representation of a further example environment through which a vehicle may travel when using an adaptive bonded communication link formed and maintained in manners detailed herein. As depicted, a number of vehicles are travelling across a route, where a number of users embark and disembark the vehicle, and have varied requirements for data communications, according to some embodiments.

In some embodiments, a complementary bonding/de-bonding servers associated with the vehicles may consider information associated with other vehicles in determining how a plurality of communication links will be utilized to provide data communications.

For example, the complementary bonding/de-bonding servers may determine that there is a potential for contention and conflict where the vehicles are operating proximate to one another, or that the communication links of another vehicle may be advantageously used by a vehicle.

In some embodiments, the complementary bonding/de-bonding server may also utilize information regarding the number of users and/or the communication requirements on other vehicles.

In some embodiments, the complementary bonding/de-bonding server and vehicles may exchange information related to the expected and/or available communication links in areas the vehicle may pass through in the future. In some embodiments, such information may be exchanged by two complementary bonding/de-bonding servers, e.g., associated with different vehicles in different areas.

In some embodiments, information related to the a fleet of vehicles (whose routes may cross) may be utilized, the system may be configured to connect with an external database having information about the fleet, such as maintenance schedules, routes, potential for co-location of vehicles, connection strength, etc. By utilizing this information, which may be pushed to the vehicles, or pulled by the vehicles, predictions may be generated of expected demand in a given zone if a traffic jam causes multiple vehicles, which might otherwise be miles apart to be located in the same area, to be in close proximity due to the traffic issues.

There may also be a number of users having higher status (e.g., a premier customer) that embark or disembark the vehicle, and the system may be configured to prioritize their data communications over lower tiers of users. In some embodiments, emergency communications may still be prioritized over the communications of the higher status users.

In some embodiments, the system may be configured to load share requests between vehicles that are co-located for a time, or between a vehicle and a transport station (which may be connected to the Internet via a fixed-link or low-cost data path). For instance, in order to reduce costs, the system may be configured to delay the download of a movie to the user via communication links available directly from the vehicle, and instead request that the data be pre-fetched and cached at a transport station that the vehicle may soon be co-located with, and to deliver the data information to the user at that point.

In other circumstances, data may be pre-fetched and cached at another vehicle, a vehicle bonding/de-bonding server, a complementary bonding/de-bonding server, an access point, etc. Data may be pre-fetched at these locations based on information expected to be accessed by the user while on the vehicle, as automatically predicted or as indicated by the user. Data may be pre-fetched at these locations to be available when a vehicle reaches a region with known poor network connectivity or limited bandwidth availability, e.g., as determined from historical data. For example, data may be pre-fetched to a location in that region, before the vehicle reaches that region.

In one example, the vehicle bonding/de-bonding server may retrieve data cached or pre-fetched at particular other vehicles or access points, e.g., by way of high capacity, short-range connections. Conversely, the system (e.g., through cooperation of a vehicle bonding/de-bonding server and a complementary bonding/de-bonding server) may also pre-fetch and/or cache data for transfer to other nearby vehicles.

In some embodiments, a vehicle bonding/de-bonding server may be configured to establish mesh networks with devices/servers at other vehicles or at network access points, e.g., at transport stations. Such mesh networks may, for example, be established to allow cached data to be retrieved from such other vehicles or network access points. Mesh network links may be established on an ad hoc basis as such other vehicles or access points come within range. In some embodiments, an adaptive bonded communication link as described herein may be formed using one or more of such mesh network links.

Figure 7:
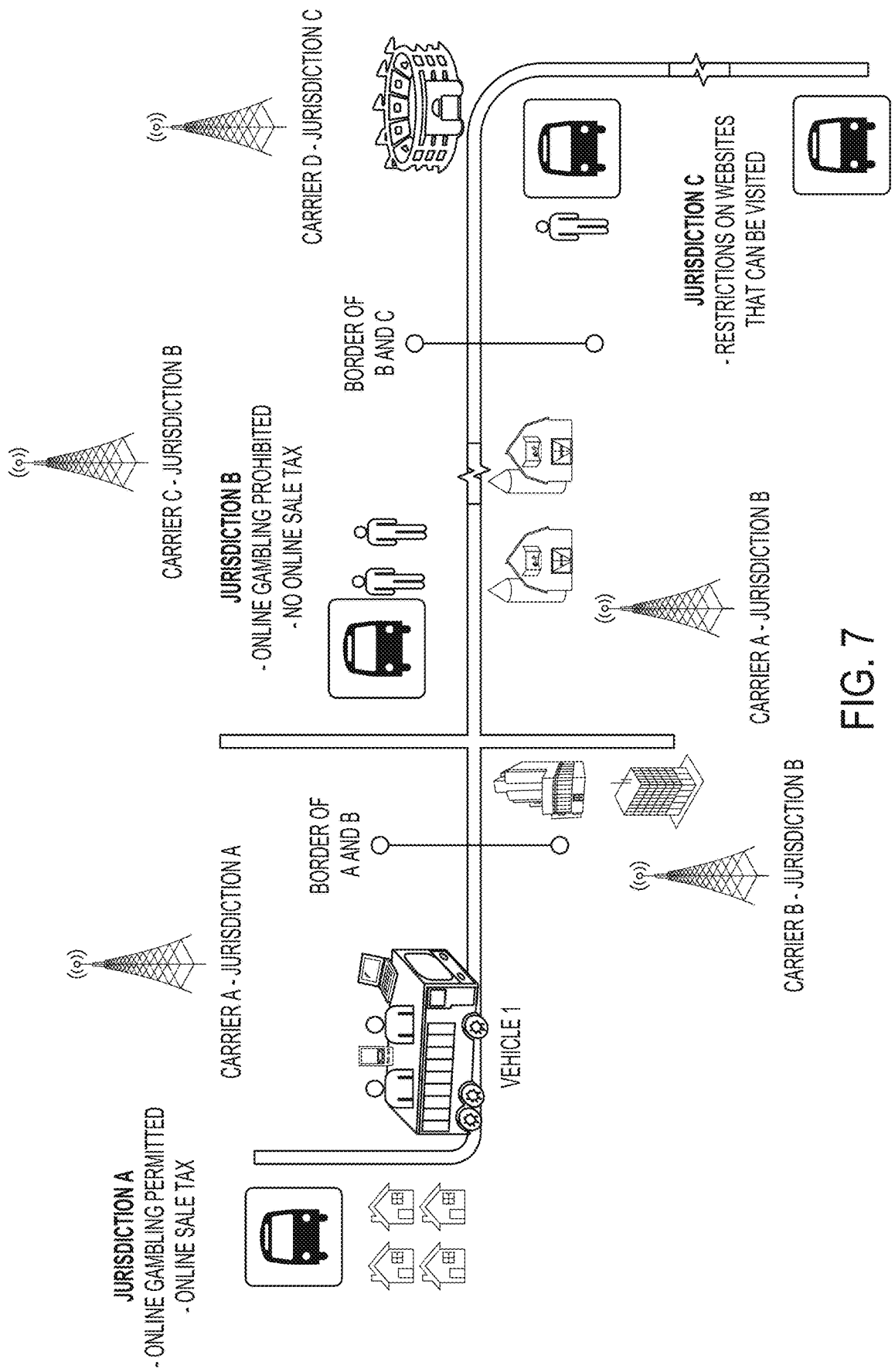
FIG. 7 is a graphical representation of a vehicle travelling across a route and crossing a number of borders between jurisdictions A, B and C, according to some embodiments.

FIG. 7 is a graphical representation of a vehicle travelling across a route and crossing a number of borders between jurisdictions A, B and C, according to some embodiments.

The jurisdictions and borders are merely provided as examples, and other variations may be contemplated. In this example, Jurisdiction A is a jurisdiction where online gambling is permitted, and there exists an online sales tax. Carrier A has a signal tower operating in Jurisdiction A, and this signal tower is associated with Jurisdiction A. Jurisdiction B prohibits online gambling, and has no online sales tax. Further, Carriers A, B and C have signal towers operating in Jurisdiction B. Jurisdiction C has restrictions on websites that can be visited, such as websites that offend public policy in the region, and may include a signal tower associated with Carrier D.

As vehicle 1 travels through Jurisdictions A, B and C, the vehicle bonding/de-bonding server and/or the complementary bonding/de-bonding server may be configured to advantageously communicate data information through the set of communication links based on rules and/or policies that take into consideration the location of vehicle 1, as well as the differences in capabilities and/or restrictions between the jurisdictions. In some embodiments, there may be roaming charges that may be incurred for data communications as the vehicle 1 travels through from jurisdiction to jurisdiction. For designated market area (DMA) based content distribution, the content (e.g., availability, licensing, etc.) may change as the vehicle moves from one jurisdiction to another. Royalty costs associated with content may also change as the vehicle moves from one jurisdiction to another.

For example, as vehicle 1 travels across the border from Jurisdiction A to Jurisdiction B, the vehicle bonding/de-bonding server and/or the complementary bonding/de-bonding server may be configured such that the transition across borders is detected and various data capabilities may be modified at such a crossing. Such detection may be based on, e.g., GPS and/or cellular location data for the vehicle.

For example, upon detecting this transition, the vehicle bonding/de-bonding server and/or the complementary bonding/de-bonding server may be configured to disable communications related to online gambling (e.g., by blocking certain services by IP address). Further, when a user is making an online purchase, the purchase may now be associated with a jurisdiction that has no online sales tax (e.g., by selecting Domain Name System (DNS) servers, or otherwise indicating the location of the user to a server on an external network, such as the Internet). Similarly, the availability of DMA-based content may change as the vehicle enters/exits various jurisdictions (e.g., content may no longer be available due to various restrictions when a vehicle leaves one country and enters another as a result of jurisdictional limits on licenses for that content or higher royalties may be payable as a result of changes in jurisdictional limits).

As noted above, the vehicle bonding/de-bonding server and/or the complementary bonding/de-bonding server may be configured to select links for forming a bonded communication link such that data communications are transmitted through particular jurisdictions, or such that data communications are transmitted while avoiding particular jurisdictions. This selection may be performed, for example, to avoid certain content restrictions (e.g., gambling), to reduce content costs, to reduce applicable taxes, etc.

In some embodiments, a communication may be provided to a user who is accessing data communications informing the user of the potential interruption to his/her services.

In some embodiments, as the vehicle travels through jurisdictions, various complementary bonding/de-bonding servers are instantiated and/or decommissioned, e.g., using cloud computer shared sources. Instances of the complementary bonding/de-bonding servers may be instantiated in response to a demand for service, e.g., transmitted by a vehicle bonding/de-bonding server. Instances of the complementary bonding/de-bonding servers may also be instantiated in response to detected proximity of a vehicle.

Instances of the complementary bonding/de-bonding servers may be instantiated at a location selected according to the location of the vehicle. For example, a complementary bonding/de-bonding server may be commissioned to be proximate (e.g., as measured according to geographical distance or network latency) to a vehicle only in one jurisdiction, and another complementary bonding/de-bonding server may commissioned to be proximate to the vehicle in another jurisdiction. In some embodiments, instances of complementary bonding/de-bonding servers may be alternatively commissioned/decommissioned based on the movement of the vehicle. The process of commissioning/decommissioning may be automatic, based on location or network characteristics, based on a particular rule, or based on requests sent by the vehicle.

Similarly, upon transitioning into Jurisdiction C, a number of restrictions may be placed on the types and/or content of websites visited. For example, Jurisdiction C may have restrictions against websites having blasphemous, politically insensitive, adult content, malicious content (e.g., computer viruses, worms), low security (e.g., non-https or un-encrypted webpages), web pages on a blacklist (e.g., pages known to spread malware), etc.

In some embodiments, regulations governing storage of end user data may also be applied to control where end user data is stored. For example, Jurisdiction A may have regulations requiring all end user data to be stored in Jurisdiction A. So, the vehicle bonding/de-bonding server and/or the complementary bonding/de-bonding server may be configured to store end user data in Jurisdiction A when the vehicle is in Jurisdiction A. Other jurisdictions may not have such requirements and data may be stored where it is convenient (e.g., where the data may be stored for fastest access or lowest cost).

In some embodiments, the system may be configured to cause advertisements to be displayed, e.g., to occupants of a vehicle on an interior screen of the vehicle or on a user's mobile device. In one example, advertisements may be presented by way of inserting the advertisements into webpages accessed by a user, e.g., as an overlay, an interstitial, etc. Some advertisements may be inserted at a vehicle bonding/de-bonding server, or at a complementary bonding/de-bonding server. For example, an advertisement may be inserted as part of a transcoding process at a complementary bonding/de-bonding server; e.g., by adding video commercials to video content. In another example, advertisements may be presented on an exterior screen of the vehicle, to be viewed by those outside the vehicle (e.g., other drivers or passersby).

In another embodiment, a coupon or reservation system for local attractions may be offered to a user, related to the time and location of the vehicle. For example, a restaurant near the terminus of a route (either for the vehicle or the user) could offer certain time or location sensitive information, such as but not limited to, reservation times or discounts based on the content requests or profile of a user and/or the expected time of arrival of the vehicle. In one specific example, a coupon may be provided if a bus is delayed past its expected time arrival by a pre-defined amount, e.g., 10 minutes.

In a further embodiment, the system may determine availability of certain services such as, but not limited to, Internet or over-the-air radio or television feeds based on the location of the vehicle on the route.

In an embodiment, the system may present advertising, offers, or services either inside or outside of the vehicle (such as but not limited to in-bus advertising displays or the user's device).

In an embodiment, the system may select advertisements, offers, or services, for presenting in manners described herein, according to the location of the vehicle and/or the type of content being requested by users on the vehicle. Advertising may also be based on other factors, such as, e.g., weather, data/time, the speed of the vehicle, acceleration, deceleration, etc.

In an embodiment, the system detects availability of certain services and/or networks is real-time or near real-time and thus is able to respond to changes in availability (e.g., as a result of network failures), or changes in routes of the vehicles. In an embodiment, the system determines availability of certain services and/or networks based on historic information and pre-defined routes for vehicles.

System Overview

Figure 8A:
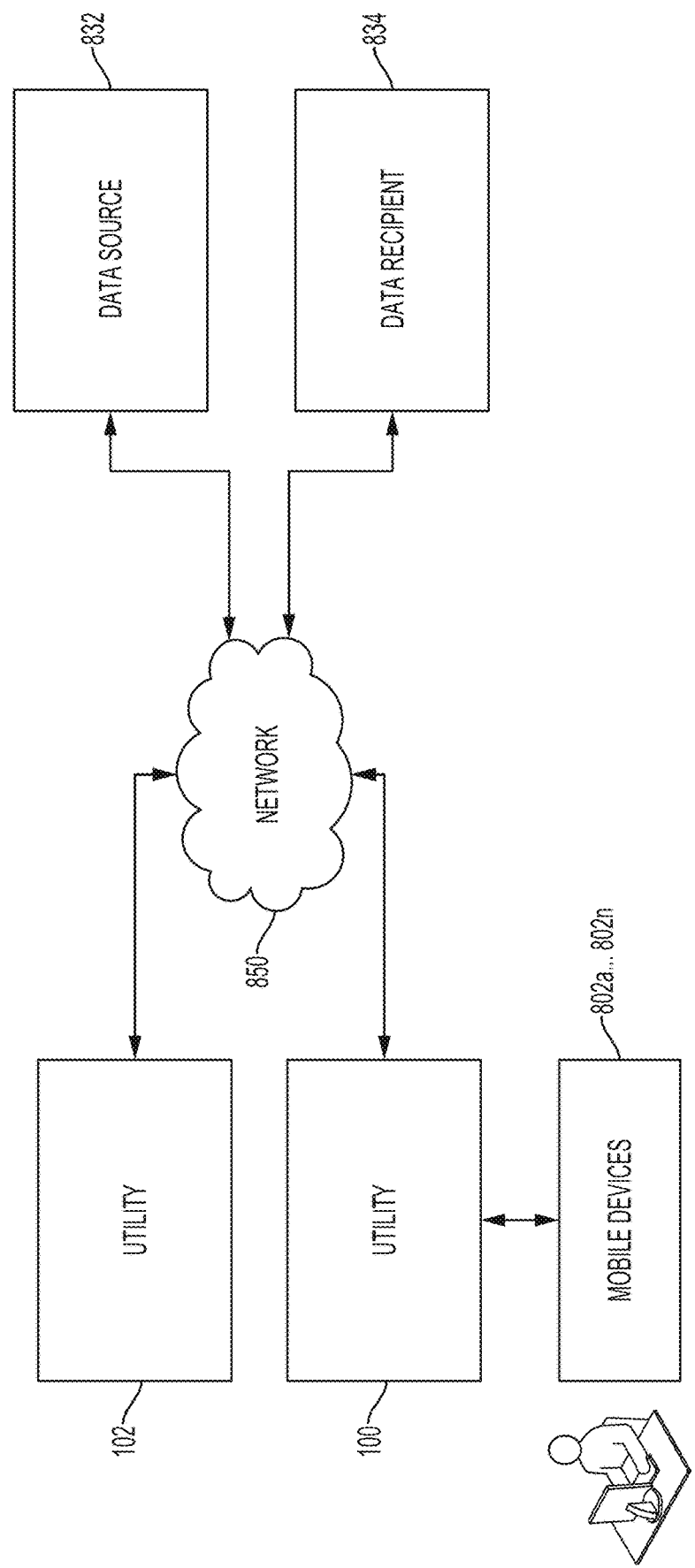
FIGS. 8A and 8B are schematic diagrams of a communication system, according to some embodiments.
Figure 8B:
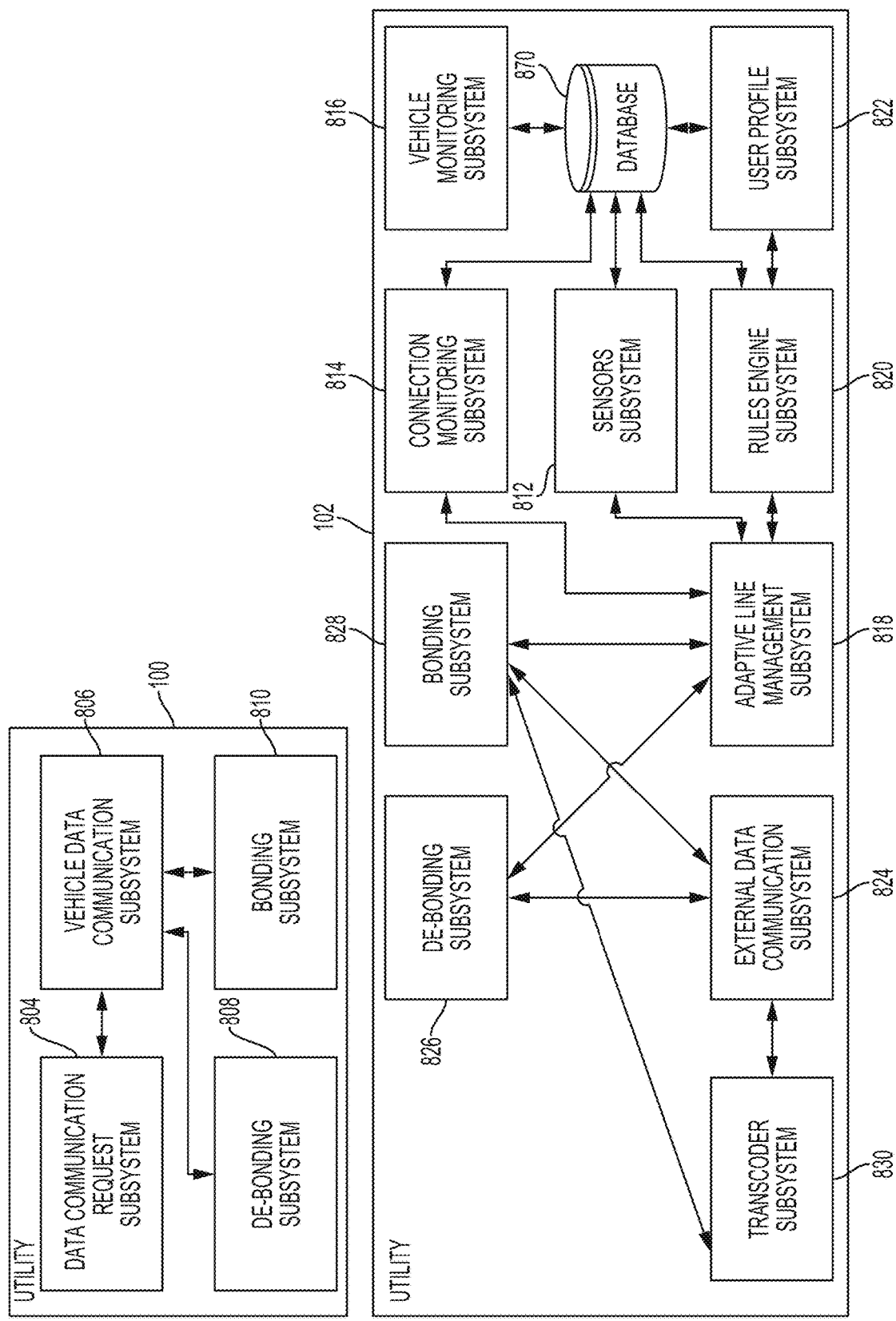

FIGS. 8A and 8B are schematic diagrams of a communication system, according to some embodiments.

Referring to FIG. 8A, the communication system includes a first utility 100 located at a vehicle (e.g., at a vehicle bonding/de-bonding server), and a second utility 102 located remotely from the vehicle (e.g., at a complementary bonding/de-bonding server). The first utility 100 and the second utility 102 are interconnected by one or more networks 850 comprising one or more communication links (including, e.g., Internet links, intranet links, point-to-point connections, point-to-multi-point connections, etc.). One or more data sources 832 and one or more data recipients 834 are also connected to the one or more networks 850.

The system may have components that reside at various locations, such as on a vehicle, in a station, at a waypoint, etc.

Data communication by a mobile device 802a . . . 802n on the vehicle (e.g., with a data source 832 or a data recipient 834) may be communicated across an adaptive bonded communication link between the first utility 100 and the second utility 102. The adaptive bonded communication link may be formed and maintained using links of networks 850 in manners detailed herein.

In one example, a mobile device 802 may transmit data to first utility 100, which transmits the data in disassembled form over the adaptive bonded communication link to the second utility 102, which reassembles the data received over the adaptive bonded communication link and transmits it across a network 850 to a data recipient 834.

Conversely, in another example, data being transmitted to a mobile device 802 on the vehicle from a data source 832 across a network 850 may first be received at the second utility 102, which may transmit the data across an adaptive bonded communication link in disassembled form to the first utility 100. The first utility 100 then reassembles the received data and transmits the data to the mobile device 802.

The first utility 100 and/or the second utility 102 may be configured to provide various intelligent features, such as the ability to transcode and/or otherwise transform received data prior to transmission, the ability to monitor communication link characteristics and/or the ability to utilize information to form and maintain adaptive bonded communication links. Such information may include, e.g., where the vehicle is, the status of the fleet, the route being taken, delay information, weather information, available communications through signal towers, variations in frequency environment, historical information, user profiles, user histories, user service levels, acceleration/deceleration, accident status, vehicle path, station capabilities, contention between users, and other factors described herein.

In some embodiments, the first utility 100 and/or the second utility 102 may be configured for adapting their operations through the use of machine learning techniques. Machine learning techniques may be utilized in analyzing historical information and modifying various coefficients and variables accordingly.

Referring to FIG. 8B, the first utility 100 may include a data communication request subsystem 804, a vehicle data communication subsystem 806, a de-bonding subsystem 808, and a bonding subsystem 810.

The data communication request subsystem 804 may be configured to receive requests for the communication of data to/from one or more mobile devices 802a . . . 802n (FIG. 8A), which may be aboard the vehicle. The data request may include information such as the filename/URL of data requested, the file type of the data requested, the type of connection required, a bandwidth requirement (e.g., based on a prediction of required bandwidth), a latency requirement, a minimum packet loss requirement, the file size of data requested, a minimum bitrate, a particular quality of service associated with the user, the particular application or service on the mobile devices 802a . . . 802n requesting data communications, the duration of the request (e.g., continuous streaming, one-time download, multiple file download), whether the request is an upload, a download, or both, etc.

The vehicle data communication subsystem 806 may be configured to communicate data between first utility 100 and a mobile device 802. The vehicle data communication subsystem 806 may be implemented using various technologies, such as a wireless connection, a wired connection, Bluetooth™, WiFi, etc.

The de-bonding subsystem 808 may be configured to receive data transmitted over a bonded communication link from the second utility 102. The de-bonding subsystem 808 may be configured to re-arrange and/or otherwise re-constitute/re-assemble data packets for transmission to the vehicle data communication subsystem 806. For example, received data may be out of order, broken into various segments, etc., requiring re-assembly and/or error correction prior to transmission to a user's mobile device 802.

The de-bonding subsystem 808 may be configured to receive data across a plurality of communication links and reassemble that data in manners substantially similar to those described in the '560 patent or the '576 patent. For example, de-bonding subsystem 808 may receive data portions (e.g., one or more data packets) by way of a plurality of RF interfaces (e.g., modems), each associated with one of the available communication links.

The bonding subsystem 810 may be configured to transmit data over a bonded communication link to the second utility 102. The bonding subsystem 810 may be configured to disassemble data for transmission to the second utility 102. For example, data, such as a large file being uploaded, may be disassembled to form smaller data packets for transmission distributed across a plurality of communication link forming the bonded communication link. In some embodiments, the disassembled data may be sent in various orders, levels of redundancy, etc. Bonding subsystem 810 may distribute data over the communication links forming the bonded communication link under the control of adaptive link management subsystem 818 of second utility 102.

Bonding subsystem 810 may be configured to disassemble and transfer data across a plurality of communication links in manners substantially similar to those described in the '560 patent or the '576 patent. For example, bonding subsystem 810 may place data portions (e.g., one or more data packets) into a plurality of transport buffers for transmission by way of a plurality of RF interfaces (e.g., modems), each of the buffers and RF interfaces being associated with one of the available communication links.

The second utility 102 may include a sensors subsystem 812, a connection monitoring subsystem 814, a vehicle path monitoring subsystem 816, an adaptive link management subsystem 818, a rules engine subsystem 820, a user profile subsystem 822, and a database 870.

The sensors subsystem 812 may be configured to receive and/or process various sensory inputs related to one or more vehicle, users, and/or the mobile devices 802a . . . 802n, or routes along which the vehicles may travel. For example, the sensors subsystem 812 may detect/receive information from a sensor at a vehicle. In some embodiments, the sensors subsystem 812 may be configured to interface with external sensors, such as accelerometers located on the vehicle, global positioning system (GPS) locators, location beacons, gyroscopes, signal strength sensors, piezo-electric sensors, radars sensors, hall effect sensors, sonar sensors, photo sensors, battery level sensors, etc.

For example, the sensors subsystem 812 may detect/receive information from a sensor disposed along a travel route to monitoring traffic flow, weather conditions, etc.

The connection monitoring subsystem 814 may be configured to monitor the availability and/or signal characteristics of one or more communications links that are available between the first utility 100 and the second utility 102. Availability may include whether the communication links may be in range for operation, whether there are available channels/slots for communication, etc. Signal characteristics may include determined latency, packet loss, signal degradation, signal strength, presence of signal artifacts, signal-to-noise ratio, noise level, interference, etc. Monitoring may be conducted at one or both of the first utility 100 and second utility 102 (e.g., to monitor latency therebetween). Some monitored results may be transmitted from the first utility 100 to the second utility 102.

The vehicle path monitoring subsystem 816 may be configured to receive and/or provide information related to the movement of the vehicle. Information related to the movement of the vehicle may include route information, delay information, re-routing information, waypoints, stations, stops, jurisdictional borders, expected embarkations/disembarkations, etc.

The user profile subsystem 822 may be configured to generate, maintain and/or update a profile associated with a particular customer that may be associated with a mobile device 802. The user profile subsystem 822 may interface with the database 870 to store and/or to access saved information representative of a user profile. The user profile may include various elements of information, such as service level, cost tolerance, historical usage, preferred customer information, loyalty program information, demographic information, advertising information and/or preferences, etc.

In some embodiments, the user profile subsystem 822 may be configured to retrieve and/or otherwise determine elements of information related to the user's profile from third party databases and/or other types of information. For example, information about a user may be derived from information captured during an online purchase, associated accounts, social media platforms, etc.

The user profile subsystem 822 may be configured to generate, maintain and/or update a set of logical rules that may be applied during the provisioning of data communications (e.g., by rules engine subsystem 820). These rules may apply to, for example, distribution of data across communication links forming a bonded communication link, the determination of whether data should be transformed/transcoded, whether associated advertising information can be associated and/or sent along with the data, whether information related to the journey can be associated and/or sent along with the data, etc. In some embodiments, the rules may be updated and/or adapted over a period of time.

The user profile subsystem 822 may be configured with rules that optimize various factors, such as cost, latency, availability, quality of service (QoS), etc. Information such as carrier spot pricing, anticipated load, expected load, user profiles, service levels, service prioritization, minimum reliability, maximum latency, expected route, actual route, traffic conditions, weather conditions, fleet information, station information etc., may be utilized by the rules engine subsystem 820 in determining and/or applying rules. Information may be retrieved from a database 870, or from various external sources, such as databases having fleet information, traffic information, weather information, etc.

Various techniques may be used to optimize these factors, such as the use of weighted coefficients, probabilistic models, statistical analysis, etc.

Database 870 may be configured store records reflective of the various data communication characteristics described herein. Database 870 may also be configured to store records reflective of the various data communication requirements described herein. In an embodiment, the second utility 102 may be configured to update these records in response to received data. For example, the records reflective of the various data communication characteristics may be updated in response to received data reflecting new measurements (e.g., obtained at the second utility 102 or at the vehicle). Such measurements may be provided, for example, by sensor subsystem 812. The records reflective of the various data communication requirements may be updated in response to received data reflective of new requirements, e.g., as may be received from a user. Data communication requirements may also be updated in response to received data reflective of the embarking or disembarking of a user from the vehicle.

The database 870 may be implemented using various database technologies, such as relational databases (e.g. SQL databases), flat databases, Excel™ spreadsheets, comma separated values, etc. If the database 870 is implemented using relational database technology, the database 870 may be configured to further store relationships between various data records. The database 870 may be implemented using various hardware of software technologies, such as solid state or hard disk drives, redundant arrays of independent disks, cloud storage, virtual storage devices, etc.

The adaptive link management subsystem 818 may be configured to form and maintain adaptive bonded communication links. In particular, adaptive link management subsystem 818 may be configured to identify available communication links (e.g., based on link availability data received from first utility 100), and may be configured to control the distribution of data communications over the available communication links forming a bonded communication link.

The adaptive link management subsystem 818 may be configured to interoperate with the user profile subsystem 820 and/or the database 870 in controlling the distribution of data communications over the available communication links. For example, communication links may be used due to their particular signal characteristics matching a desired set of characteristics related to the particular required communication. For example, a user may be watching a video and requesting video data be transmitted from a data source 832 across the Internet. The user may have a gold-service level associated with the user's profile, and the user may be travelling from city A to city B.

Both supply and demand characteristics of available and predicted bandwidth may be utilized to intelligently provision data communication services that can be offered on a given route, based both on historical data for a given route (e.g., different zones, different passenger profiles, different network characteristics, different jurisdictions, different passenger loads, different times), and real/near real-time data (e.g., alterations of routes, actual passenger loads, actual passenger data requests, network outages, network interference).

Communication links may be selected to provide a reliable service level to the user in a downlink direction, having sufficient bandwidth to handle the user's request, and being available across the time and locations in which the user will be travelling.

In some embodiments, the adaptive link management subsystem 818 may be configured for load-balancing requests between various users and available communication links. For example, if there are more requests than can be handled by available communication links, the adaptive link management subsystem 818 may be required to apply rules rationing the use of limited bandwidth, prioritizing use for particular users/services and/or triaging communications based on various factors.

These various factors may include, for example, rules for maintaining QoS associated with particular users and/or particular applications, e.g., based on priority levels assigned to users or based on QoS requirements of particular applications (e.g., latency and bandwidth requirements of live video streaming). Such rules may be stored, for example, in database 870 in association with a user profile maintained by user profile subsystem 822. The rules may be processed by rules engine subsystem 820.

Various rules for maintaining QoS may be used to allocate available bandwidth in an adaptive bonded communication link amongst users and applications. For example, QoS rules may be based on bandwidth requirements of particular users/applications (hereinafter referred to as "Bandwidth QoS rules"). In one example, users may be divided into three categories based on their assigned priority levels:

1. High priority, capped bandwidth requirement.
2. Best effort priority, capped bandwidth requirement.
3. Best effort priority, minimum bandwidth requirement For these priority levels, an example vehicle may include the following example mix of users:

1. High priority, capped bandwidth requirement:
   TSA security camera streaming video at a constant 2 Mbps
   Bus sensors/telemetry, streaming data constantly at 0.5 Mbps
2. Best effort priority, capped bandwidth requirement
   10 free users riding the bus—capped at 1 Mbps each
   2 paying users riding the bus—capped at 3 Mbps each
3. Best effort priority, minimum bandwidth requirement
   2 broadcast customers attempting to stream real-time video, requiring a minimum of 5 Mbps each, but are able to use as much bandwidth as is available to obtain better video quality Given this mix of users, the nominal bandwidth demand on the system is 28.5 Mbps (2+0.5+10*1+2*3+2*5), and the following three example allocations of available bandwidths are possible:

1. Example 1: Bus has 50 Mbps bandwidth
   Every user gets their nominal amount.
   The remaining 21.5 Mbps is split proportionally between the 2 broadcast customers (i.e. an additional 10.75 Mbps each)
2. Example 2: Bus has 20 Mbps bandwidth
   High priority users get their nominal amounts.
   The remaining 17.5 Mbps is split proportionally between the best effort users. i.e.
      Free users get 17.5 Mbps*1/(1*10+2*3+2*5)=~0.673 Mbps each
      Paying users get 17.5 Mbps*3/(1*10+2*3+2*5)=~2.02 Mbps each
      Broadcast customers get 17.5 Mbps*5/(1*10+2*3+2*5)=~3.37 Mbps each
3. Example 3: Bus has 1 Mbps bandwidth
   The 1 Mbps is split proportionally between the 2 high priority users. i.e.
      TSA security camera gets 1 Mbps*2/(2+0.5)=0.8 Mbps
      Bus sensors/telemetry get 1 Mbps*0.5/(2+0.5)=0.2 Mbps
   Best effort users get no bandwidth The above bandwidth allocations are provided as examples only and other allocations based on other Bandwidth QoS rules are possible.

QoS rules may also be based on latency requirements of particular users/applications (hereinafter referred to as "Latency QoS rules"), which may be used in conjunction with Bandwidth QoS rules. For example, the example mix of users described above may have the following latency requirements:
1. High priority, capped bandwidth requirement
   TSA security camera streaming video at a constant 2 Mbps, latency requirement <500 ms
   Bus sensors/telemetry, streaming data constantly at 0.5 Mbps, latency requirement <1000 ms
2. Best effort priority, capped bandwidth requirement
   10 free users riding the bus—capped at 1 Mbps each, no latency requirement
   2 paying users riding the bus—capped at 3 Mbps each, no latency requirement
3. Best effort priority, minimum bandwidth requirement
   2 broadcast customers attempting to stream real-time video, requiring a minimum of 5 Mbps each, but are able to use as much as is available to obtain better video quality. Latency requirement <100 ms Given these latency requirements, the nominal bandwidth demand on the system (categorized by latency) is:
1. 2 Mbps @<500 ms latency
2. 0.5 Mbps @<1000 ms latency
3. 10 Mbps (2*5 Mbps) or more @<100 ms latency
4. 16 Mbps (10*1+2*3), with no latency requirements Given these additional latency requirements, the system determines latency on each available communication link (e.g., at each modem) and allocates bandwidth on those links to meet latency requirements. For example, bandwidth may be allocated in view of the latency requirements as follows:
1. High priority users proportionally split the bandwidth on the modems that satisfy their latency constraints, up to their capped bandwidth amount.
2. Best effort priority users proportionally split the bandwidth on the modems that satisfy their latency constraints, up to their capped bandwidth amounts.
3. Any remaining bandwidth that still satisfies the latency constraints is allocated proportionally to the remaining "best effort minimum bandwidth requirement" users The above bandwidth allocations are provided as examples only and other allocations based on other Latency QoS rules are possible.

QoS rules may also be applied at an application layer once bandwidth has been allocated to particular users, e.g., using Bandwidth QoS rules and/or Latency QoS rules.

For example, a user's laptop might have a background process downloading operating system updates, while in the foreground they are browsing the web and logging into a remote terminal (via SSH). The latter two applications may be given a higher priority over the operating system updates to improve QoS. In this case, the system may employ various techniques (e.g., including various algorithms and heuristics) to differentiate between bulk transfers (e.g., background operating system updates or file downloads) and interactive transfers (e.g., foreground applications involving user input or output to the user, or basic services required by many applications such as a DNS service). For example, techniques may involve monitoring the duration of connections, port numbers used, transport protocols used, frequency/size of packets, contents of packets, amongst other factors.

For example, the following techniques may be employed:
1. Monitor the lifetime of a connection and the size of the data transferred. For example, the first 100 KB of each TCP flow could be given high priority, and any subsequent bytes could be treated as a bulk transfer and thus be low priority.
2. Monitor the port numbers and frequencies/sizes of packets sent back and forth. Interactive SSH sessions typically run over TCP port 22, and will tend to contain small packets (<100 bytes) sent to the server as the user types keyboard commands, with varying sizes of return packets (anywhere between 5 and 1000 bytes) containing responses to those commands.
3. Parse the application layer protocol (e.g. HTTP), and prioritize the requests/responses that are smaller than a certain size. This technique is different than (1) because HTTP connections can be persistent, so a long lived one might exceed the threshold in (1) and be treated as low priority, when it should be kept as high priority since it is actually just a series of smaller requests.

Other techniques for differentiating between bulk and interactive transfers may also be used to apply QoS rules at the application layer.

The external data communication subsystem 824 may be configured for retrieving data across one or more networks 850 from a data source 832, and transmitting data across one or more networks 850 to a data recipient 834. In one example, a request may be indicated from a user's mobile device 802 requesting video data from a video sharing platform (e.g., at data communication request subsystem 804). The external data communication subsystem 824 may be configured to access the Internet to retrieve the information from a data source 832 (e.g., a server associated with the video sharing platform). The retrieved data may be provided to bonding subsystem 828 for transmission to the first utility 100. In another example, a request may be indicated from a user's mobile device 802 requesting video data to be transmitted to the video sharing platform. The data may be received from the user at de-bonding subsystem 826, which may provide the data to external data communication system 824.

In some embodiments, the data from the data source 832 may first be transformed by the transcoder subsystem 830. The transcoder subsystem 830 may be configured to transform (e.g., transcode) information. For example, pictures may be received at a particular resolution, audio at a particular bitrate and/or video at a particular frame rate, compression format, and/or encoding method. The transcoder subsystem 830 may be configured for the transformation of such data to other types of formats and/or encoding that may be more suitable for transmission, especially where there is limited bandwidth and/or reliability.

In some embodiments, the transcoder subsystem 830 may be configured to reduce the quality and/or compress data prior to transmission (e.g., compression of textual documents, image compression, audio compression, audio bitrate reduction, video quality reduction, image quality reduction). In some embodiments, the transcoder subsystem 830 may be configured to apply and/or associate metadata tags with various elements of data (e.g., indicating order of data packet, transformation characteristics, compression characteristics).

In some embodiments, the transcoder subsystem 830 may be configured for the encryption/decryption of data communications.

The bonding subsystem 828 may be configured to communicate data across an adaptive bonded communication link to the de-bonding subsystem 808 of the first utility 100. Bonding subsystem 828 may distribute data over the communication links forming the bonded communication link between the first utility 100 and the second utility 102 under the control of adaptive link management subsystem 818 of second utility 102.

The de-bonding subsystem 826 may be configured to complementarily receive data across an adaptive bonded communication link from the bonding subsystem 810 of the first utility 100. In some embodiments, the de-bonding subsystem 826 may be configured for the re-assembly, re-constitution and/or rearrangement of received data, as received data may be disassembled, segmented, degraded and/or out of order.

In some embodiments, first utility 100 may include components configured for control of adaptive bonded communication links between the first utility 100 and the second utility 102 (e.g., one or more of adaptive link management subsystem 818, user profile subsystem 822, rules engine subsystem 820, database 870, etc.). In some embodiments, each of first utility 100 and second utility 102 may form and maintain a different adaptive bonded communication link, e.g., a first bonded link for data communication sent through bonding subsystem 810, and a second bonded link for data communications sent through bonding subsystem 828. In some embodiments, control of adaptive bonded communication links between the first utility 100 and the second utility 102 may be wholly controlled at the first utility 100 such that control components may be omitted from the second utility 102.

Sample Workflow

Figure 9:
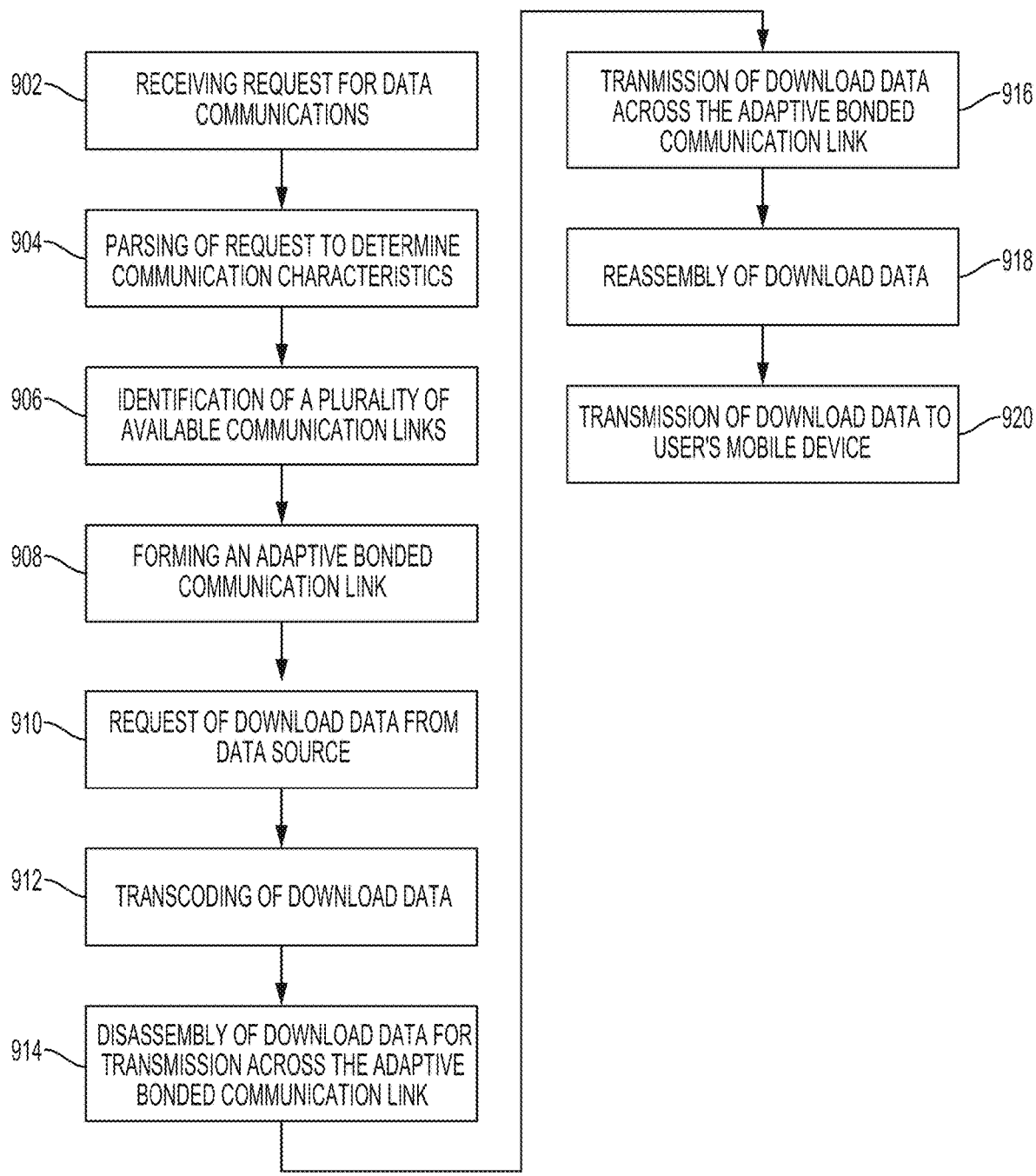
FIG. 9 is a sample workflow depicting an example use case where a user is requesting data through the user's mobile device, and the user is on a vehicle that travels from a first location to a second location, according to some embodiments.

FIG. 9 is a sample workflow depicting an example use case where one or more users are requesting data communications through the users' mobile devices 802a . . . 802n, and the users are on a vehicle that travels from a first location to a second location, according to some embodiments.

At 902, a user uses his/her mobile device 802 to connect to the network on-board the vehicle (e.g., by way of the vehicle data communication subsystem 806). The user's mobile device 802 then submits a request for data communications, in this example, a streamed video from a video streaming platform available on the Internet.

At 904, the request is received and parsed by the data communication request subsystem 804. The data communication request subsystem 804 then routes the request for data to be retrieved to the external data communication subsystem 824 (at second utility 102). The data communication request subsystem 804 may also communicate to the vehicle data communication subsystem 806 and the adaptive link management subsystem 818 information related to the request (e.g., download, type of request, requesting service, TCP/UDP communication).

At 906, the adaptive link management subsystem 818 identifies a plurality of communication links available at a current location of the moving vehicle.

At 908, if an adaptive bonded communication link is not already available, the adaptive link management subsystem 818 forms an adaptive bonded communication link using the available communication links. The adaptive link management subsystem 818 configures the bonded communication link to adapt to various factors described herein, e.g., data communication requirements for the requested data transfer, and to data communication characteristics of the available communication links, through the application of rules from the user profile subsystem 820, etc. Adaptive link management subsystem 818 controls the distribution of data communication amongst the available communication links based on factors.

At 910, the external data communication subsystem 824 requests and receives data information from data source 832 through the network 850.

At 912, a transcoder subsystem 830 may, optionally, intercept the data received from data source 832 and transcodes and/or transforms the data information such that the information is more readily adapted for communication across the communication links. For example, compression methods may be utilized, reductions in quality and/or bitrates may be introduced, etc.

At 914, the bonding subsystem 828 disassembles the data received from source 832 (optionally transcoded) for transmission across the adaptive bonded communication link, and at 916, the bonding subsystem 828 transmits the data in disassembled form across the adaptive bonded communication link under the control of the adaptive link management subsystem 818. The data is received by de-bonding subsystem 808 at the first utility 100.

At 918, the data is re-assembled, re-constituted or otherwise re-arranged by the de-bonding subsystem 808 and transmitted to the vehicle data communication subsystem 806.

At 920, the re-assembled data is transmitted by the data communication subsystem 806 to the mobile device 802.

Figure 10:
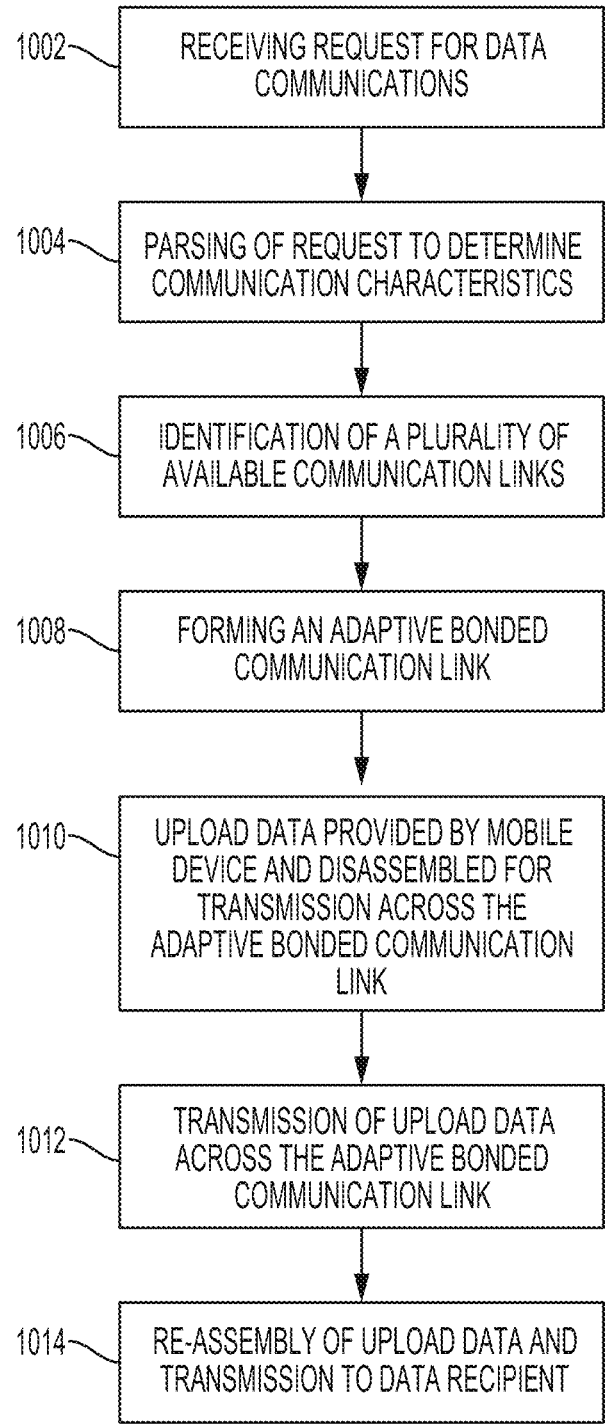
FIG. 10 is a sample workflow depicting an example use case where a user is requesting the transmission of data from the user's mobile device to a data recipient, and the user is on a vehicle that travels from a first location to a second location, according to some embodiments.

FIG. 10 is a sample workflow depicting an example use case where one or more users are requesting the transmission of data from the users' mobile devices 802a . . . 802n to a data recipient 834, and the users are on a vehicle that travels from a first location to a second location, according to some embodiments.

At 1002, a user uses his/her mobile device 802 to connect to the network on-board the vehicle (e.g., by way of the vehicle data communication subsystem 806). The user's mobile device 802 then submits a request to transmit a data communication to data communication request subsystem 804, in this example, a video recording to a data recipient 834 accessible by the network 850.

At 1004, the request is received and parsed by the data communication request subsystem 804. The data communication request subsystem 804 may communicate to the vehicle data communication subsystem 806 and the adaptive link management subsystem 818 information related to the request (e.g., upload, type of request, requesting service, TCP/UDP communication).

At 1006, the adaptive link management subsystem 818 identifies a plurality of communication links available at a current location of the vehicle.

At 1008, if an adaptive bonded communication link is not already available, the adaptive link management subsystem 818 forms an adaptive bonded communication link using the available communication links. The adaptive link management subsystem 818 configures the bonded communication link to adapt to various factors described herein.

At 1010, upload data may be provided by the mobile device 802 to the vehicle data communication subsystem 806. The vehicle data communication subsystem 806 may then transfer the data information to the bonding system 810, which may then cause the data information to be disassembled and/or otherwise prepared for transmission across the adaptive bonded communication link to the second utility 102.

At 1012, the upload data is transmitted across the adaptive bonded communication link in disassembled form and received by a de-bonding subsystem 826 at the second utility 102.

At 1014, the upload data information is re-assembled, re-constituted or otherwise re-arranged by the de-bonding subsystem 826 and transmitted to the data recipient 834 through the network 850 by external data communication subsystem 824.

In some embodiments, utility 100 may include a transcoder subsystem substantially similar to transcoder subsystem 830 of utility 102. In such embodiments, utility 100 may transcode data for upload, e.g., to a data recipient 834, prior to transmission to utility 102 by way of a bonded communication link. For example, utility 100 may transcode data at 1008 (FIG. 10) and provide the transcoded data to the bonding system 810, for disassembly and transmission to utility 102.

Similarly, utility 100 may be encrypt data for upload, e.g., to a data recipient 834, prior to transmission to utility 102 by way of a bonded communication link. For example, utility 100 may encrypt data at 1008 (FIG. 10) and provide the encrypted data to the bonding system 810, for disassembly and transmission to utility 102.

Embodiments have been described in the foregoing with reference to buses as an example of a vehicle. However, the systems and methods disclosed herein may be used in conjunction with any type of vehicle. Further, it will be understood that the term "vehicle" is used broadly to encompass machines for various modes of transportation, including, e.g., transportation by ground, underground, air, sea, undersea, outer space, etc. So, the term "vehicle" may refer to buses, taxis, airplanes, ships, etc. Further, for greater certainty, the term "vehicle" includes both manned and unmanned vehicles. Unmanned vehicles may include, for example, driverless cars, unmanned aerial vehicles, or the like.

Computer-Related Implementation

The system described above is configured for interaction with various physical elements and/or information derived from physical elements, such as vehicles, sensors, logistics, signals, etc. There may be interoperability with large-scale databases, leading to various commercial advantages, such as cost savings, increased service levels, increased customer satisfaction, organizational differentiators, etc.

With respect to computer-implemented embodiments, the description provided may describe how one would modify and/or otherwise configure a computer to implement the system or steps of a method. The specific problem being solved may be in the context of a computer-related problem, and the system may not be meant to be performed solely through manual means or as a series of manual steps.

Computer-related implementation and/or solutions may be advantageous in the context of some embodiments; at least for the reasons of providing scalability (the use of a single platform/system to manage a large number of activities); the ability to quickly and effectively pull together information from disparate networks; improved decision support and/or analytics that would otherwise be unfeasible; the ability to integrate with external systems whose only connection points are computer-implemented interfaces; the ability to achieve cost savings through automation; the ability to dynamically respond and consider updates in various contexts (such as fleet information, traffic updates, gathered physical data, location information); the ability to apply complex logical rules that would be infeasible through manual means (e.g., selective usage of communication links through complex load balancing methodologies); the ability for data communications to be truly anonymous; among others.

Using electronic and/or computerized means can provide a platform that may be more convenient, scalable, efficient, accurate, and/or reliable than traditional, non-computerized means. Further, many systems for tracking paid time off may be computerized and the platform may advantageously be designed for interoperability, and manual operation may be difficult and/or impossible.

Scalability may be useful as it may be advantageous to provide a system that may be able to effectively manage a large number of available communication links, requests and/or interconnections and/or integration with external systems.

The convenience and effectiveness of a solution may be valuable in the context of data communications as users often do not receive a sufficient quality of service using conventional systems. The convenience and ease of use may lead to higher ridership and/or increased customer satisfaction.

Figure 11:
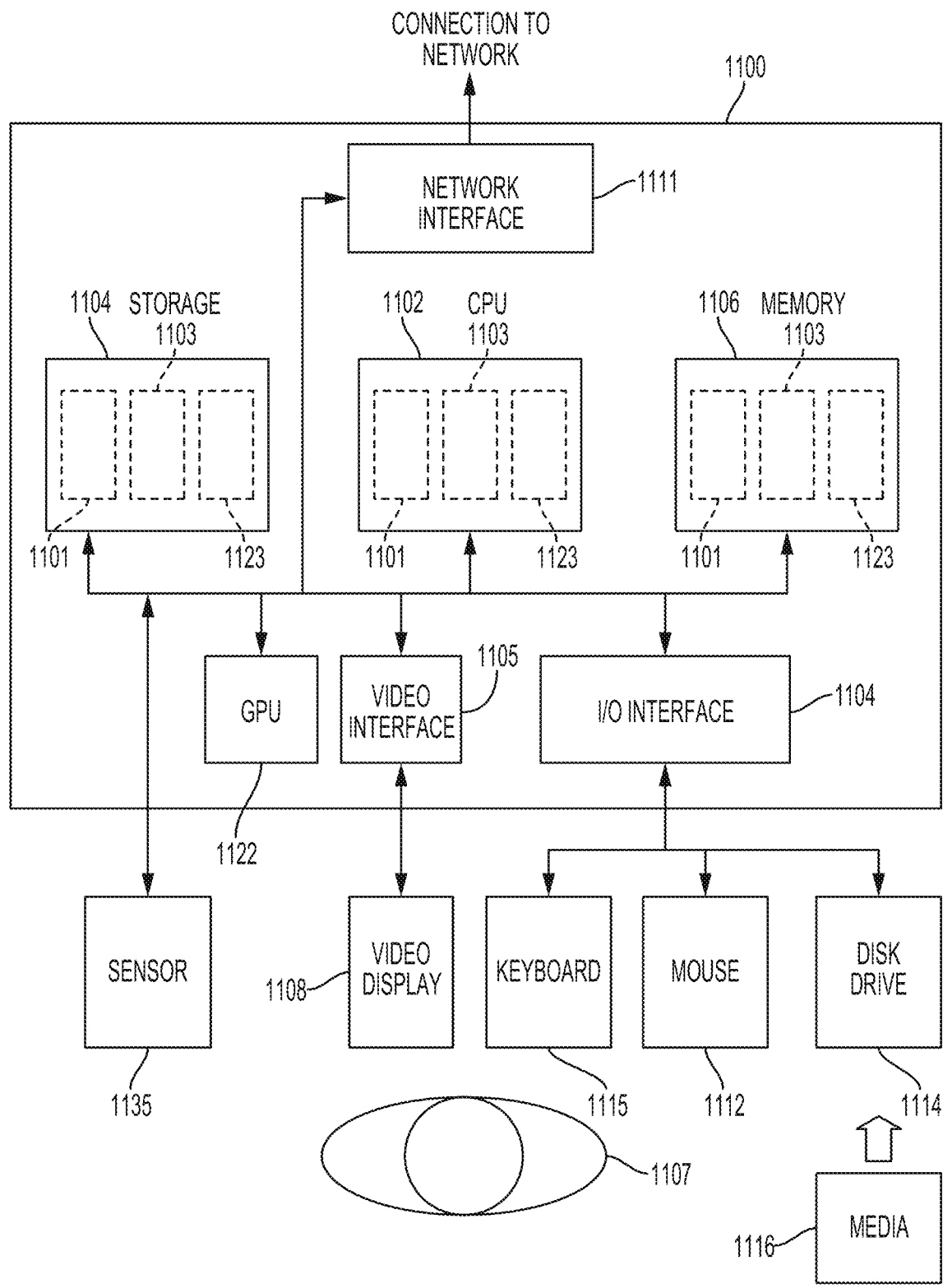
FIG. 11 is a schematic diagram illustrating a computer device, and associated communications networks, devices, software and firmware that may be configured to provide a platform for enabling one or more embodiments as described above.

By way of example, FIG. 11 shows a computer device 1100 that may include a central processing unit ("CPU") 1102 connected to a storage unit 1104 and to a random access memory 1106. The CPU 1102 may process an operating system 1101, application program 1103, and data 1123. The operating system 1101, application program 1103, and data 1123 may be stored in storage unit 1104 and loaded into memory 1106, as may be required. Computer device 1100 may further include a graphics processing unit (GPU) 1122 which is operatively connected to CPU 1102 and to memory 1106 to offload intensive image processing calculations from CPU 1102 and run these calculations in parallel with CPU 1102. An operator 1107 may interact with the computer device 1100 using a video display 1108 connected by a video interface 1105, and various input/output devices such as a keyboard 1115, mouse 1112, and disk drive or solid state drive 1114 connected by an I/O interface 1109. In known manner, the mouse 1112 may be configured to control movement of a cursor in the video display 1108, and to operate various graphical user interface (GUI) controls appearing in the video display 1108 with a mouse button. The disk drive or solid state drive 1114 may be configured to accept computer readable media 1116. The computer device 1100 may form part of a network via a network interface 1111, allowing the computer device 1100 to communicate with other suitably configured data processing systems (not shown). One or more different types of sensors 1135 may be used to receive input from various sources.

The present system and method may be practiced on various types of computer devices including an industrial (embedded) computer, desktop computer, laptop computer, tablet computer or wireless handheld. The present system and method may also be implemented as a computer-readable/useable medium that includes computer program code to enable one or more computer devices to implement each of the various process steps in a method in accordance with the present invention. In case of more than computer devices performing the entire operation, the computer devices are networked to distribute the various steps of the operation. It is understood that the terms computer-readable medium or computer useable medium comprises one or more of any type of physical embodiment of the program code. In particular, the computer-readable/useable medium can comprise program code embodied on one or more portable storage articles of manufacture (e.g. an optical disc, a magnetic disk, a tape, etc.), on one or more data storage portioned of a computing device, such as memory associated with a computer and/or a storage system.

The mobile application of the present invention may be implemented as a web service, where the mobile device includes a link for accessing the web service, rather than a native application.

The functionality described may be implemented to any operating system, including Linux, Unix, iOS™, ANDROID™, WINDOWS™ or BLACKBERRY™ or other similar operating systems.

It will be appreciated by those skilled in the art that other variations of the embodiments described herein may also be practiced without departing from the scope of the invention. Other modifications are therefore possible.

In further aspects, the disclosure provides systems, devices, methods, and computer programming products, including non-transient machine-readable instruction sets, for use in implementing such methods and enabling the functionality described previously.

Although the disclosure has been described and illustrated in exemplary forms with a certain degree of particularity, it is noted that the description and illustrations have been made by way of example only. Numerous changes in the details of construction and combination and arrangement of parts and steps may be made. Accordingly, such changes are intended to be included in the invention, the scope of which is defined by the claims.

Except to the extent explicitly stated or inherent within the processes described, including any optional steps or components thereof, no required order, sequence, or combination is intended or implied. As will be understood by those skilled in the relevant arts, with respect to processes and any systems, devices, etc., described herein, a wide range of variations is possible, and even advantageous, in various circumstances, without departing from the scope of the invention, which is to be limited only by the claims.

What is claimed is:

1. A device for data communication to and from a vehicle, the device comprising:
   a computer memory storing processor-executable instructions;
   a plurality of communication interfaces; and
   at least one processor in communication with the memory and the plurality of communication interfaces, the at least one processor configured to execute the stored processor-executable instructions to:
      receive, from at least one user on the vehicle, at least one request for data communication;
      identify a plurality of communication links available at a current location of the vehicle for communication by way at least one of the communication interfaces through one or more corresponding proximate signal towers relative to a location of the vehicle;
      form an adaptive bonded communication link using the plurality of communication links to aggregate throughput across the plurality of communication links for the requested data communication, wherein the adaptive bonded communication link is configured to adapt to data communication requirements for the requested data communication and to data communication characteristics of the plurality of communication links as the vehicle moves along a path on which the device connects to communication links through the corresponding proximate signal towers, each signal tower of the corresponding proximate signal towers associated with a corresponding carrier having a corresponding set of carrier networking policies governing data communication across communication links associated with the corresponding proximate signal tower;
      wherein the adaptive bonded communication link, responsive to the one or more requests for data communication, communicates transcoded or transformed data that is transcoded or transformed in accordance with the data communication requirements, the corresponding set of carrier networking policies, and the data communication characteristics; and
      wherein said adapting of the adaptive bonded communication link is in real-time or near real-time, and is responsive to at least one of (i) changes in the data communication requirements or (ii) changes in the data communication characteristics of the two or more communication links.

2. The device of claim 1, wherein said adapting of the adaptive bonded communication link includes selecting the plurality of communication links based on a type of content being transmitted on the adaptive bonded communication link, the plurality of communication links selected to avoid certain non-preferred carriers.

3. The device of claim 1, wherein the at least one processor executes the stored instructions to provide a virtual subscriber identity module (SIM) manager that configures at least one the communication interfaces with SIM information.

4. The device of claim 1, wherein at least one of the plurality of network interfaces includes a plurality of subscriber identity modules, and the at least one processor executes the stored processor-executable instructions to select a particular one of the plurality of subscriber identity modules for forming the adaptive bonded communication link.

5. The device of claim 1, wherein the data communication characteristics comprise at least one of: network costs, monetary costs, available bandwidth, latency, and packet loss rates, data transfer available under a data plan associated with at least one SIM.

6. The device of claim 5, wherein the monetary costs comprise at least one of spot pricing costs and overage pricing costs.

7. The device of claim 1, wherein the data communication requirements comprise at least one of: a minimum packet loss requirement, monetary costs, a bandwidth requirement, a latency requirement, a status associated with the at least one user, or a Quality of Service (QoS) requirement.

8. The device of claim 1, wherein the adaptive bonded communication link is formed based on the corresponding carrier associated with at least one of the plurality of communication links being utilized for the adaptive bonded communication link.

9. The device of claim 1, wherein the at least one processor executes the stored processor-executable instructions to restrict data communications based on the corresponding carrier associated with at least one of the plurality of communication links being utilized for the adaptive bonded communication link.

10. The device of claim 9, wherein the data communications are restricted according to content type.

11. A computer-implemented method for providing data communication to and from a vehicle, the method comprising:
   receiving, at at least one processor, at least one request for data communication from at least one user on the vehicle;
   identifying, at the at least one processor, a plurality of communication links available at a current location of the vehicle for communication by way at least one communication interfaces established through one or more corresponding proximate signal towers relative to a location of the vehicle; and forming, at the at least one processor, an adaptive bonded communication link using the plurality of communication links to aggregate throughput across the plurality of communication links for the requested data communication;

wherein the adaptive bonded communication link is configured to adapt to data communication requirements for the requested data communication and to data communication characteristics of the plurality of communication links as the vehicle moves along a path on which the system connects to communication links through corresponding proximate signal towers, each signal tower of the corresponding proximate signal towers associated with a corresponding carrier having a corresponding set of carrier networking policies governing data communication across the corresponding proximate signal tower;

wherein the adaptive bonded communication link, responsive to the one or more requests for data communication, communicates transcoded or transformed data that is transcoded or transformed in accordance with the data communication requirements, the corresponding set of carrier networking policies, and the data communication characteristics; and wherein said adapting of the adaptive bonded communication link is in real-time or near real-time, and is responsive to at least one of (i) changes in the data communication requirements or (ii) changes in the data communication characteristics of the two or more communication links.

12. A system for data communication across a plurality of communication links to and from a vehicle, involving at least one mobile device on the vehicle, the system comprising:

one or more servers, each having a processor and one or more computer readable memories, the one or more servers providing a first utility located on the vehicle and a second utility located remotely from the vehicle;

at least one of the first and second utilities configured for:
receiving a request to retrieve electronic data from a data source by at least one mobile device;

identifying a plurality of communication links available to the vehicle through one or more corresponding proximate signal towers relative to a location of the vehicle;

forming an adaptive bonded communication link using the plurality of communication links to aggregate throughput across the plurality of communication links for the data communication, wherein the adaptive bonded communication link is configured to adapt to data communication requirements of the at least one user and to data communication characteristics of the plurality of communication links as the vehicle moves along a path on which the system connects to communication links through corresponding proximate signal towers, each signal tower of the corresponding proximate signal towers associated with a corresponding carrier having a corresponding set of carrier networking policies governing data communication across communication links associated with the corresponding proximate signal tower;

the second utility configured for:
retrieving the electronic data from the data source;
transmitting the electronic data in disassembled form through the adaptive bonded communication link to the first utility;

the first utility configured for:
transmitting the electronic data to the at least one mobile device;

wherein the adaptive bonded communication link, responsive to the one or more requests for data communication, communicates transcoded or transformed data that is transcoded or transformed in accordance with the data communication requirements, the corresponding set of carrier networking policies, and the data communication characteristics; and wherein said adapting of the adaptive bonded communication link is in real-time or near real-time, and is responsive to at least one of (i) changes in the data communication requirements or (ii) changes in the data communication characteristics of the two or more communication links.

13. The system of claim 12, wherein said adapting of the adaptive bonded communication link includes selecting the plurality of communication links based on a type of content being transmitted on the adaptive bonded communication link, the plurality of communication links selected to avoid certain non-preferred carriers.

14. The system of claim 12, wherein the second utility is implemented as a cloud-based shared resources platform.

15. The system of claim 12, wherein the first utility or the second utility is configured to trigger the operation of one or more cloud-based resources based on at least one of (i) a demand for service or (ii) proximity to the vehicle.

16. The system of claim 15, wherein the triggering comprises instantiating an instance of the second utility.

17. The system of claim 16, wherein the instance of the second utility is instantiated at a location selected according to the location of the vehicle.

18. The system of claim 12, wherein the second utility is configured to transcode the electronic data prior to transmission through the adaptive bonded communication link.

19. The system of claim 12, wherein at least one of the first and second utilities includes an electronic datastore storing data records reflective of the data communication characteristics.

20. The system of claim 19, wherein the data records store historical data reflective of data communication characteristics of communication links along an expected travel route of the vehicle.

* * * * *